United States Patent [19]

Denning

[11] Patent Number: 4,741,045

[45] Date of Patent: Apr. 26, 1988

[54] OPTICAL CHARACTER ISOLATION SYSTEM, APPARATUS AND METHOD

[75] Inventor: Bruce S. Denning, San Jose, Calif.

[73] Assignee: Dest Corporation, Milpitas, Calif.

[21] Appl. No.: 535,410

[22] Filed: Sep. 23, 1983

[51] Int. Cl.$^4$ .............................................. G06K 9/34
[52] U.S. Cl. ........................................... 382/9; 382/40; 382/48
[58] Field of Search .................. 382/9, 57, 48, 32, 3, 382/13, 40

[56] References Cited

U.S. PATENT DOCUMENTS

| | | | |
|---|---|---|---|
| 2,905,927 | 9/1959 | Reed | 382/40 |
| 3,213,423 | 10/1965 | Congleton | 382/32 |
| 3,588,818 | 6/1971 | Congleton et al. | 382/48 |
| 4,190,820 | 2/1980 | Crane et al. | 382/3 |
| 4,251,799 | 2/1981 | Jih | 382/48 |
| 4,377,803 | 3/1983 | Lotspiech et al. | 382/9 |
| 4,379,282 | 4/1983 | Bailey | 382/9 |
| 4,449,239 | 5/1984 | Bernhardt et al. | 382/48 |
| 4,562,592 | 12/1985 | Chainer et al. | 382/3 |

Primary Examiner—Leo H. Boudreau
Assistant Examiner—Joseph Mancuso
Attorney, Agent, or Firm—Flehr, Hohbach, Test, Albritton & Herbert

[57] ABSTRACT

Low cost, high-speed, optical character isolation and page reconstruction system, method and apparatus are presented which overcome problems caused by copied pages, noise, underlines, skewed and bowed text, forms features, logos and signatures. As characters or noise are isolated and recognized, their corresponding bit patterns in memory are deleted. Recognized characters are isolated within entire words at a time to form page image records which are then linked to form lines of words. The text on the original page is then reconstructed from lines of words to yield output signals suitable for input to a host word processor.

19 Claims, 28 Drawing Sheets

NOISE FILTERING

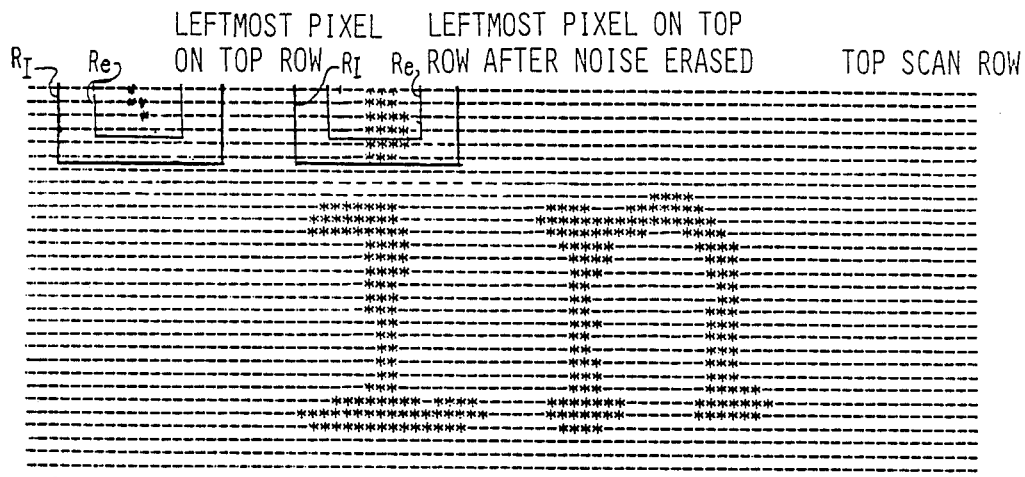

ASSUME $T_N = 6$ $R_I$ TOTAL BLACK COUNT FOR ABOVE NOISE = 4, ∴ $R_E$ ERASED $R_I$ TOTAL BLACK COUNT FOR ABOVE VALID FEATURE = 21, ∴ $R_E$ RETAINED

Figure 4

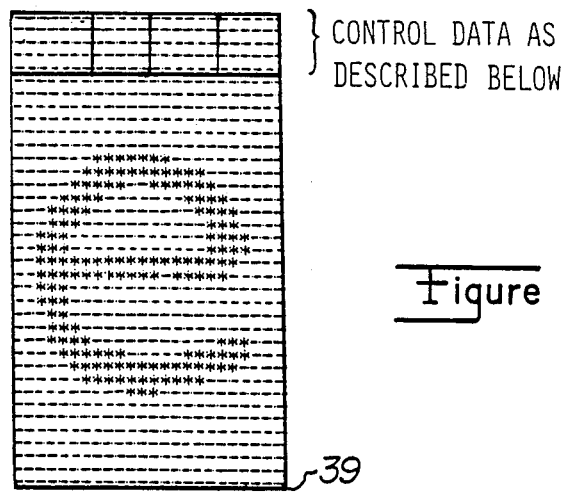

RECOGNITION BUFFER

Figure 5

IN ADDITION TO A DIGITIZED IMAGE OF A SINGLE PRESUMED CHARACTER, THE RECOGNITION BUFFER ALSO CONTAINS:

1. CHARACTER STATUS (IDLE, AWAITING RECOGNITION, RECOGNITION COMPLETE
2. CHARACTER X + Y AXIS PIXEL ORIGIN
3. BEST FIT AND NEXT BEST FIT ASCII VALUE AND CORRELATION SCORE (AFTER RECOGNITION)

UNDERLINE PROCESSING

——————— NORMAL-MODE ——— TOUCHING ——— NORMAL-MODE ———
                        CHAR. MODE

PREVIOUS UL AVG TOP

UL ERASED RIGHT TO LEFT

TOP PORTION OF NEXT LINE

1. EXCESSIVE UL TOP VARIANCE INCREASES IRREGULARITY COUNT
2. EXCESSIVE UL BASE VARIANCE INCREASES IRREGULARITY COUNT
3. SMALL GAPS INCREASE IRREGULARITY COUNT
4. LARGE GAPS BOUND UL KERNEL SEARCH
5. IF KERNEL IS FOUND, LARGE GAPS ARE BRIDGED TO RECOVER ALL OF UL
   WHERE
   $n_{ke} = 2$     $v_N = 5$
   $n_{\mu E} = 8$  $v_T = 2$
6. VERTICAL STROKE DETECTED - ENTER TOUCHING CHAR MODE
7. PIXELS WHICH WOULD NORMALLY BE ERASED ARE RETAINED, SINCE PREVIOUS AVERAGE TOP IS USED AS TOP OF UL
8. SMALL TOP VARIANCES ARE ALLOWED IN TOUCHING CHAR

Figure 6

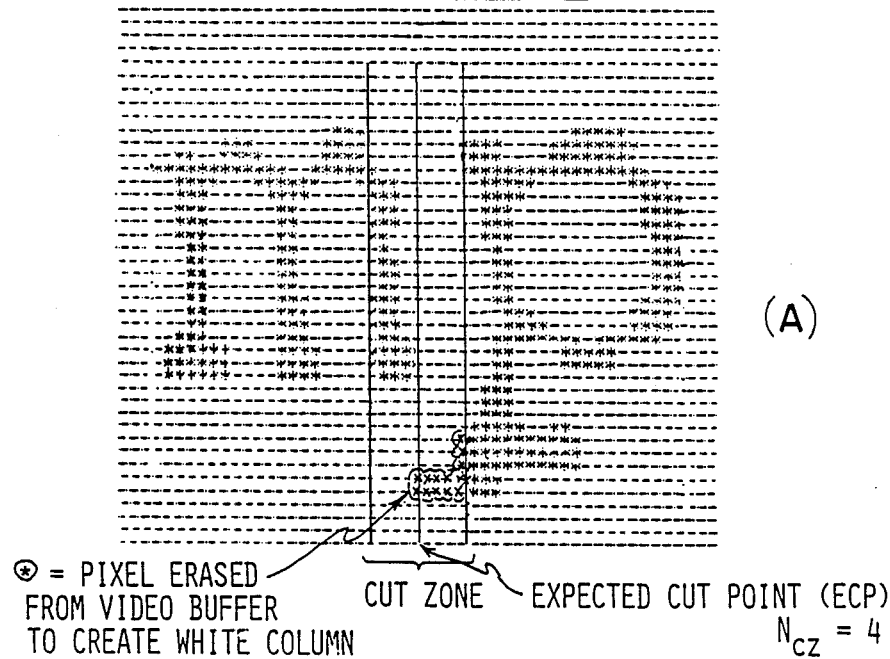
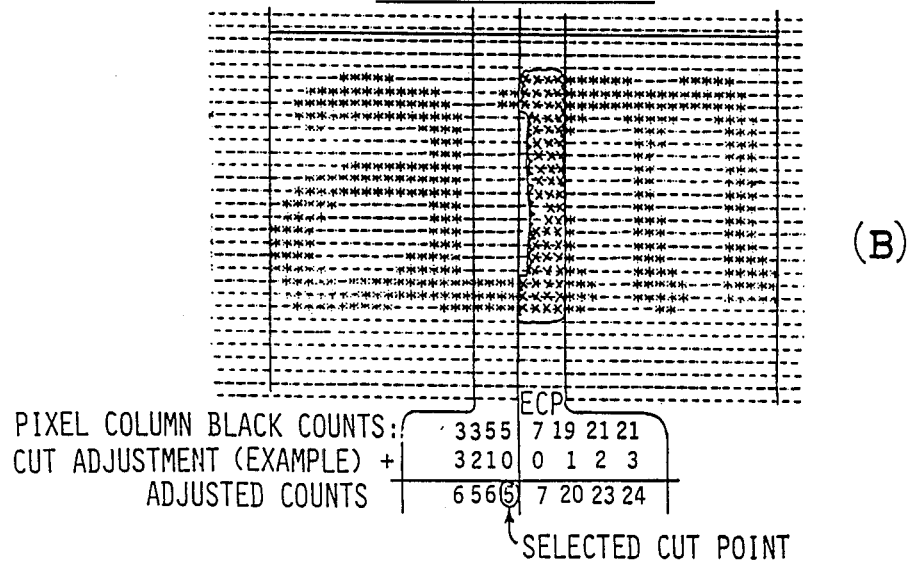
Figure 7

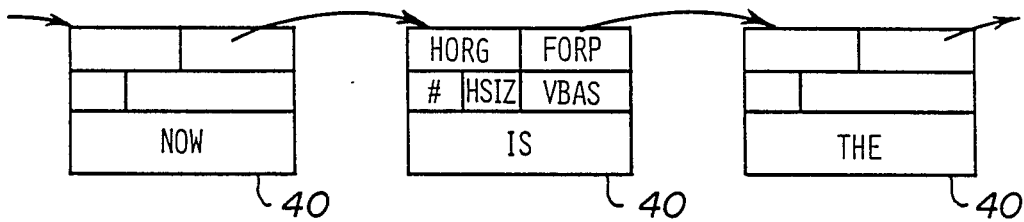

HORG - HORIZONTAL PIXEL ORIGIN IN PIXELS OF LEFTMOST CHARACTER IN PIR. PIR'S ARE FORE LINKED IN ASCENDING HORIZONTAL ORIGIN, REGARDLESS OF VERTICAL BASELINE

FORP - FOREPOINTER TO NEXT PIR IN CHAIN

- PIR STATUS AND # OF ASCII CHARACTERS IN PIR

HSIZ - HORIZONTAL SIZE IN PIXELS (WIDTH) MEASURED FROM LEFT SIDE OF FIRST CHARACTER TO RIGHT SIDE OF LAST CHARACTER IN PIR

VBAS - AVERAGE ASCII-CORRECTED BASELINE OF CHARACTERS IN PIR

Figure 11

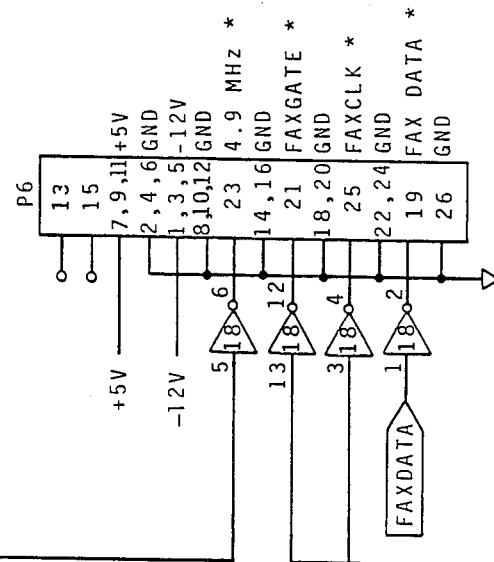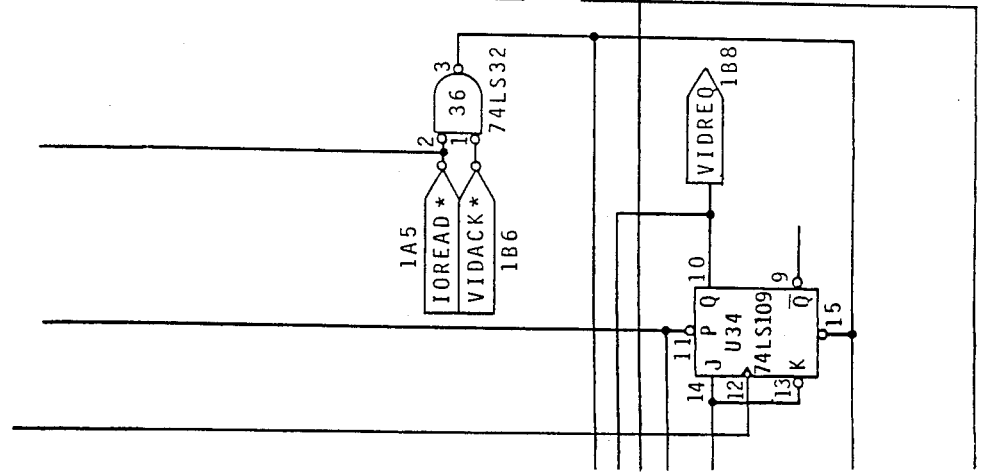
Figure 13
Figure 13C-5

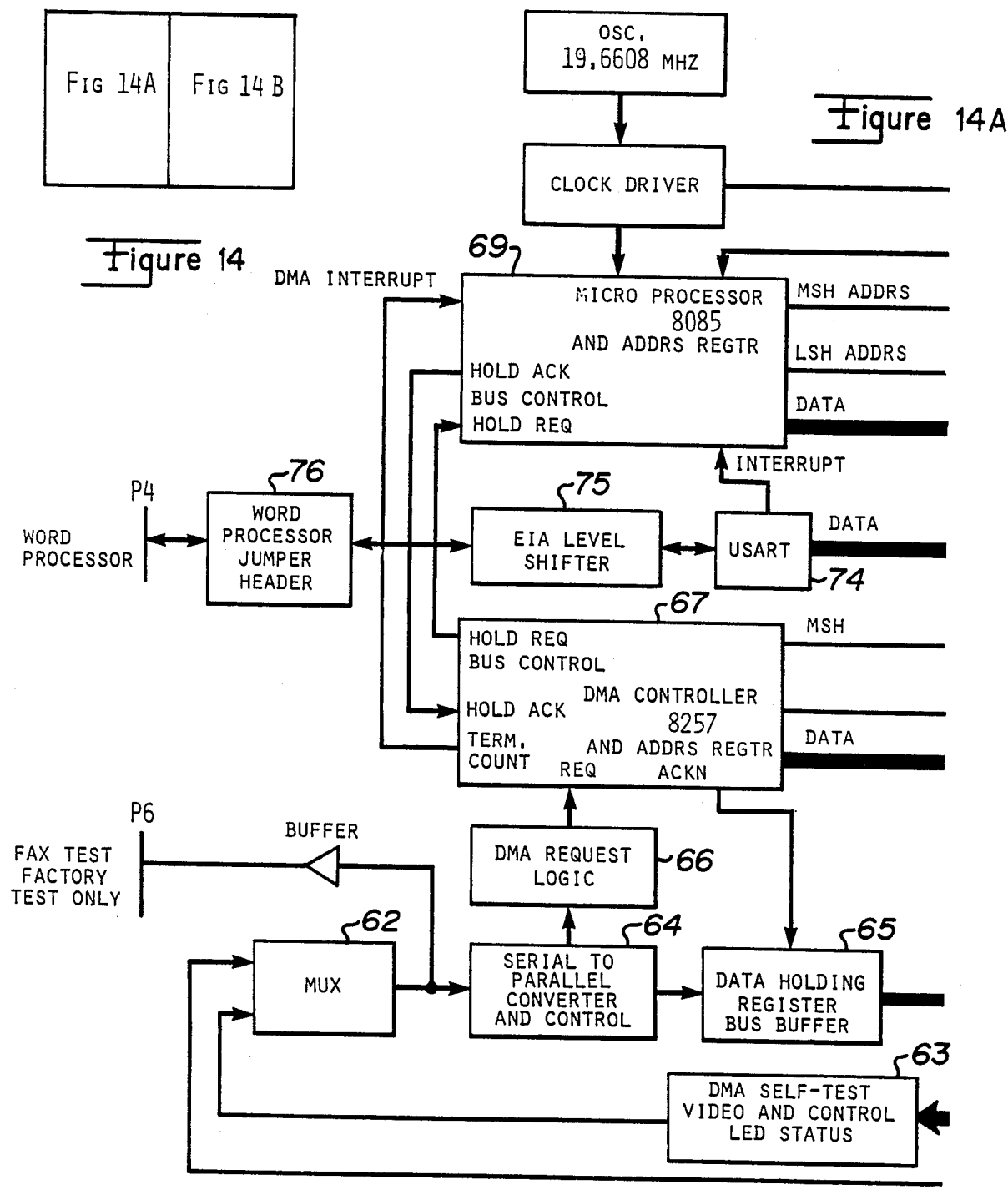

OPTICAL CHARACTER ISOLATION SYSTEM, APPARATUS AND METHOD

BACKGROUND OF THE INVENTION

Typical optical character-recognition (OCR) systems comprise three major subsystems, namely: (a) Character Isolation, which handles paper detection, video scanner control, pre-recognition noise filtering, and the identification of character data fields suitable for recognition; and (b) Character Recognition, which attempts to identify the character described by a character data field provided by character isolation and may include some combination of mask correlation, feature analysis, decision trees, and other recognition techniques; and (c) Character Post Processing, which may include context and feature analysis, post recognition noise filtering, text spacing and skew adjustment, and communications.

The relative complexity of these subsystems will vary depending on the nature of the text being read and the accuracy desired. Early OCR systems for typed pages used OCR specific fonts such as OCR-A and allowed little or no random noise (dirt, copier marks, paper imperfections, etc.), line misalignment, or character touching. For these systems, simple isolation, recognition and post processing techniques yielded acceptable results. Later OCR systems for typed pages used improved recognition schemes to allow the use of standard fonts, such as Prestige Elite, but still were intolerant to noise, page misalignment and character touching. These latter systems were adequate for use with carefully prepared original documents, but were unacceptable when used with documents of uncontrolled quality or surface characteristics. In particular, character-isolation problems for these random documents (caused by skewed lines, touching characters, excessive smudging, and non-recognizable fonts) are often a greater source of error than character recognition problems.

The two schemes normally used for video data acquisition in an OCR system are either X-axis scan or Y-axis scan schemes. In an X-axis scan, a narrow 1-to-3 character high scan region (provided by an 80-to-150 photodiode element high × 1 photodiode element wide array) is commonly swept across a page normally from left to right. Vertical picture elements or "pixel" columns are assembled in memory until a sufficiently wide data region, normally one to three characters, has been constructed. Characters are isolated within this region and passed to recognition. Scanning, isolation and recognition are normally performed as synchronous operations. Scanning and recognition schemes are described in the literature (see, for example, U.S. Pat. No. 4,379,282 and applications Ser. Nos. 452,494 and 470,241). The major advantage of the X-scan scheme is the relative low cost of the video array and memory required. A major disadvantage of this scheme is the cost and complexity of the horizontal shuttle required to create the X-axis scan. Another disadvantage is that uncertainties in isolation and recognition of characters must be resolved in a limited amount of time as the shuttle moves on to adjacent characters.

In a Y-axis scan, a long narrow horizontal scan region (provided by a 1600-to-2500 element wide × 1 element high array) is commonly swept down a page. Horizontal pixel rows are built up in memory until an entire line of text has been stored, and isolation and recognition then operate on the line image stored in memory. The major advantage of this scheme is the elimination of an X-axis shuttle mechanism and the availability of an entire line of stored data to the isolation routine. One disadvantage of this scheme is the relative high cost of the array and memory required.

Most low cost OCR systems to data have employed the X-axis scan scheme due to its lower overall cost. Character isolation techniques for X-axis scanners must take into account such problems as line-skew correction and synchronized processing. In an ideal page, an X-axis scanner need only scan the height of a single line, advance a known distance to the next line, and scan the next line, etc., until the page is completely processed. Unfortunately, variances in inter-line spacing, page skew with respect to the scan array, and text skew with respect to the page edge, all force the use of a scan array which scans a region at least two rows high, in order to scan an entire line on one shuttle pass. Since data from at least two lines of text is available to the character-isolation subsystem, it is usually necessary to select and forward to recognition only those characters which comprise the current line. Typical schemes for identifying the current line include prescanning the entire line to determine the baselines and/or skew angles of the entire line and/or each word in the line. The line position information gained in such a prescan can then be used to identify the regions to be passed to isolation on a second pass. Current line identification schemes are subject to failure in the presence of underlines, "bowed" text lines, excessive skew, noise, and the like.

Also, the shuttle mechanisms used in low cost X-axis scanners may involve a typewriter-like carriage or a rotating drum holding the page or a hand-held wand. All of these shuttle mechanisms normally sweep from left to right across a page in a continuous rather than incremental fashion. In such a system character isolation and recognition normally proceed in synchronism with the shuttle mechanism, thus limiting the maximum time available for the isolation or recognition of problem characters. Sophisticated but desirable isolation and recognition techniques may be unusable because they require excessive operating time when implemented in software and excessive cost when implemented in hardware.

Recent reductions in video array and memory costs have made Y-axis scanners cost competitive with X-axis scanners in low cost OCR systems. Although the X-axis isolation techniques can be used in a Y-axis scanner, it is highly desirable to provide a low cost, high-speed isolation scheme suitable for use with a Y-axis scanner which obviates the aforementioned problems.

SUMMARY OF THE INVENTION

In accordance with the character-isolation scheme of the present invention, a Y-axis scanner is adapted to scan vertically along a page of typed characters and to assemble the resulting video data in a video data buffer as the scanning advances. Then, all white scan rows (with no character or noise information) are discarded from the top of the video buffer. Instead of isolating characters from left to right, as in an X-axis scanner, characters are isolated left-to-right within the entire word which appears topmost in the video buffer due, for example, to skew relationship between the normal to scan direction and the scanned line of text. As noise and characters are identified by isolation, they are passed to recognition and then erased from the top of the video buffer by introducing the data equivalent of white space in place of the recognized character or noise.

At the end of each word, the isolation scheme repeats on only the entire word which next appears topmost in the video buffer. In this way, only the topmost characters and words appearing in the scan "window" are isolated and recognized at a time. Since the characters are not isolated or recognized in strict left-to-right order, they may be stored as intermediate word records until a complete line can be assembled from the recognized word characters by linking each word to the adjacent word(s).

Thus, in accordance with the present invention, only the uppermost word is isolated at a time and it is therefore not necessary to hold an entire skewed line in the video buffer at one time. Instead, the buffer need only be "tall" enough (i.e., have enough data space) to contain a single, tall, skewed word, and any excess data space may be used to pre-buffer the rest of a skewed line or other lines of text. The maximum allowable skew of a line is limited only by the ability of the recognition scheme to handle individually skewed characters, and by the ability to reassemble adjacent words of a line using the horizontal and vertical position of each recognized word.

Since the present invention does not rely on baseline analysis or skew angle analysis during isolation, it is less susceptible to errors caused by excessive noise, bowed lines, excessively skewed lines, lines embedded in unrecognizable forms features, and underlines. The video acquisition, isolation, recognition, and recognition post processing in the present invention are all totally asynchronous, and it is therefore practical to implement high isolation rates in excess of 200 characters/second by using optimized microprocessor assembly language routines to handle the typical isolation cases while using specialized isolation schemes for problem characters without the use of any special purpose isolation hardware.

Once a character is recognized, its ASCII code values can be used to identify sub- and superscripts and ascender and descender portions of the character. Also, since word baselines are determined only after recognition is complete, the expected baseline variations based upon ASCII values can be used to derive an accurate word baseline according to the present invention, even in difficult cases such as the words "soggy" and "gym". This accurate word baseline can be used as the basis of specialized post processing routines which can solve difficult character problems by differentiating between similarly shaped characters such as upper and lower case "p".

DESCRIPTION OF THE DRAWINGS

FIG. 4 is a pictorial diagram of a bit pattern in buffer memory; and FIG. 5 is a pictorial diagram of a bit pattern for an isolated character in recognition buffer; and FIG. 6 is a pictorial diagram of a bit pattern in memory illustrating the underline and touching feature processing;

FIGS. 7a and b are pictorial diagrams of bit patterns in memory illustrating, respectively, overlapping characters and touching characters; FIG. 11 is a pictorial diagram of page image records linked together to form lines; FIGS. 13A-1, 13A-2, 13A-3, 13A-4, 13A-5, 13A-6, 13B-1, 13B-2, 13B-3, 13C-1, 13C-2, 13C-3, 13C-4, 13C-5 comprise a block schematic diagram of the character-isolating apparatus; and FIGS. 14a and 14b are a schematic diagram of the isolation processor.

DESCRIPTION OF THE PREFERRED EMBODIMENT

Figure 1:
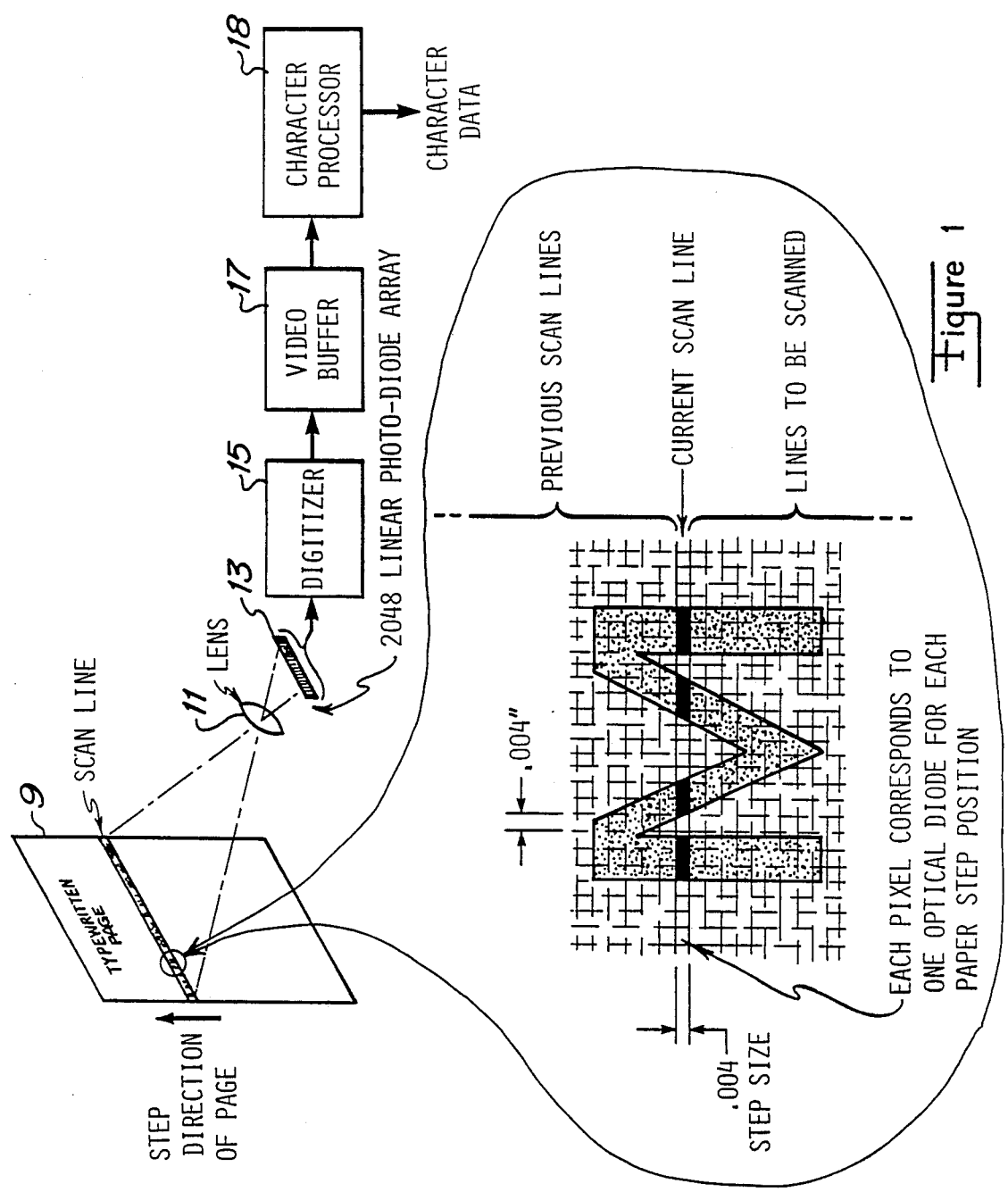
FIG. 1 is a pictorial diagram of a Y-scanner according to the present invention.

Referring now to FIG. 1, there is shown a pictorial diagram of a Y-scanner according to one embodiment of the present invention. A sheet of paper 9 containing typed text which is to be recognized is movably positioned relative to an optical lens 11 and video scanner 13 (e.g., Reticon photodiode array) in order to impart relative vertical motion between page 9 and the scanner 13 in the direction shown. A digitizer 15 is connected to receive the output signals from the video scanner 13 and to introduce into the buffer 17 the accumulated bits of scan data representing the portions of the characters being scanned. The buffer 17 therefore accumulates the signal representations in memory corresponding to the characters being scanned.

Figure 2:
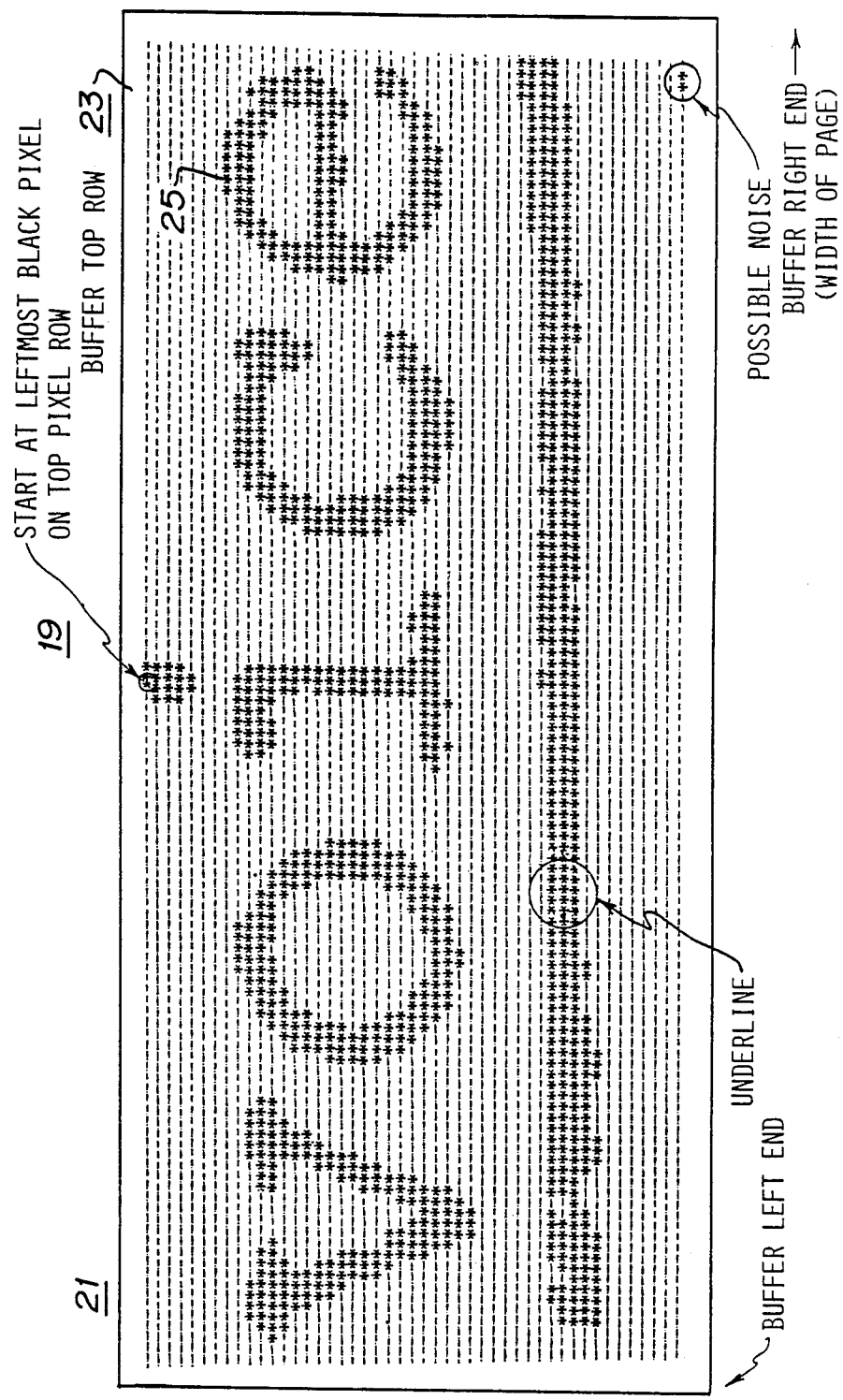
FIG. 2 is a pictorial diagram of the data signal equivalent bit pattern in buffer memory.
Figure 3A:
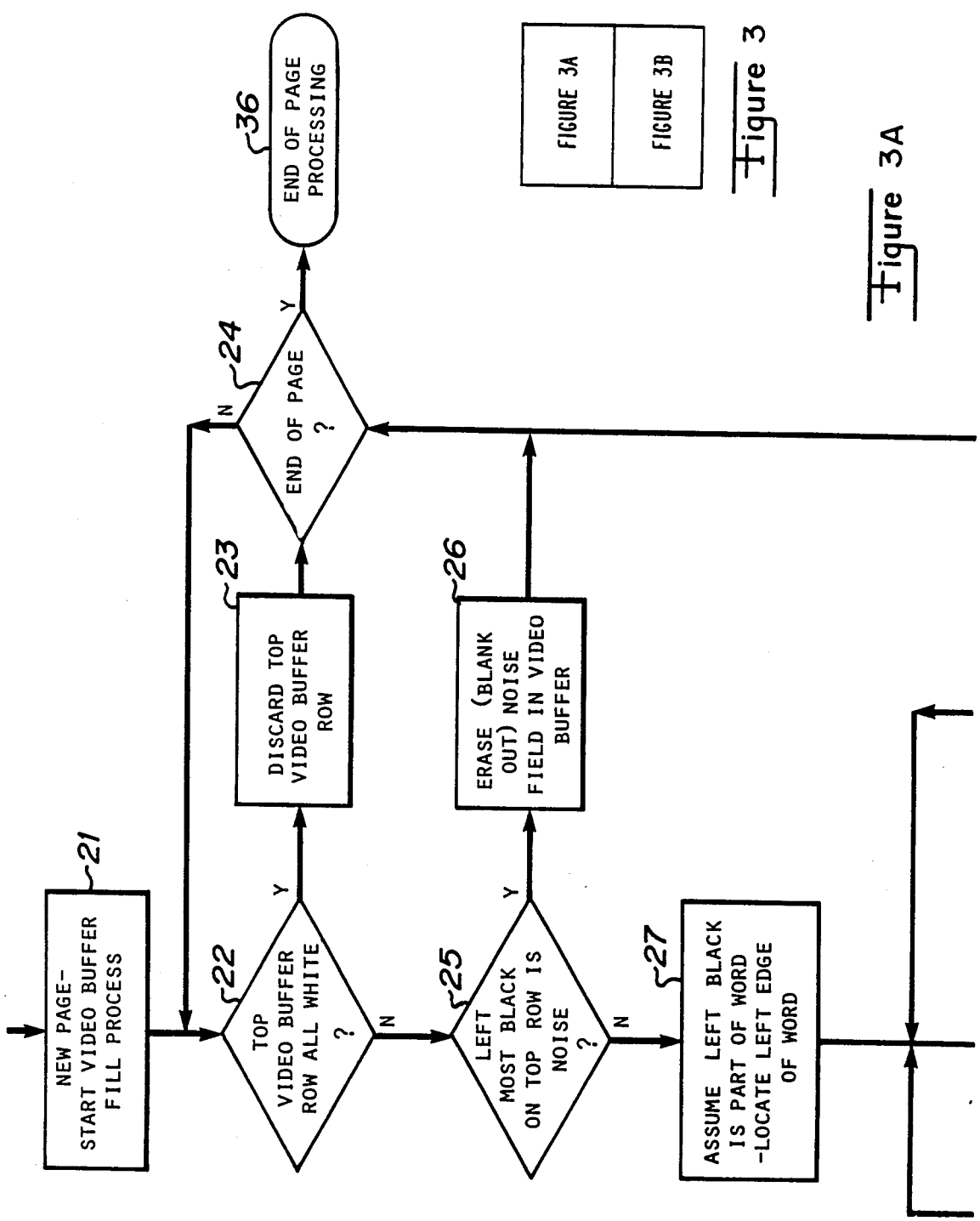
FIGS. 3a and 3b are a flow chart illustrating character-isolation processing.
Figure 3B:
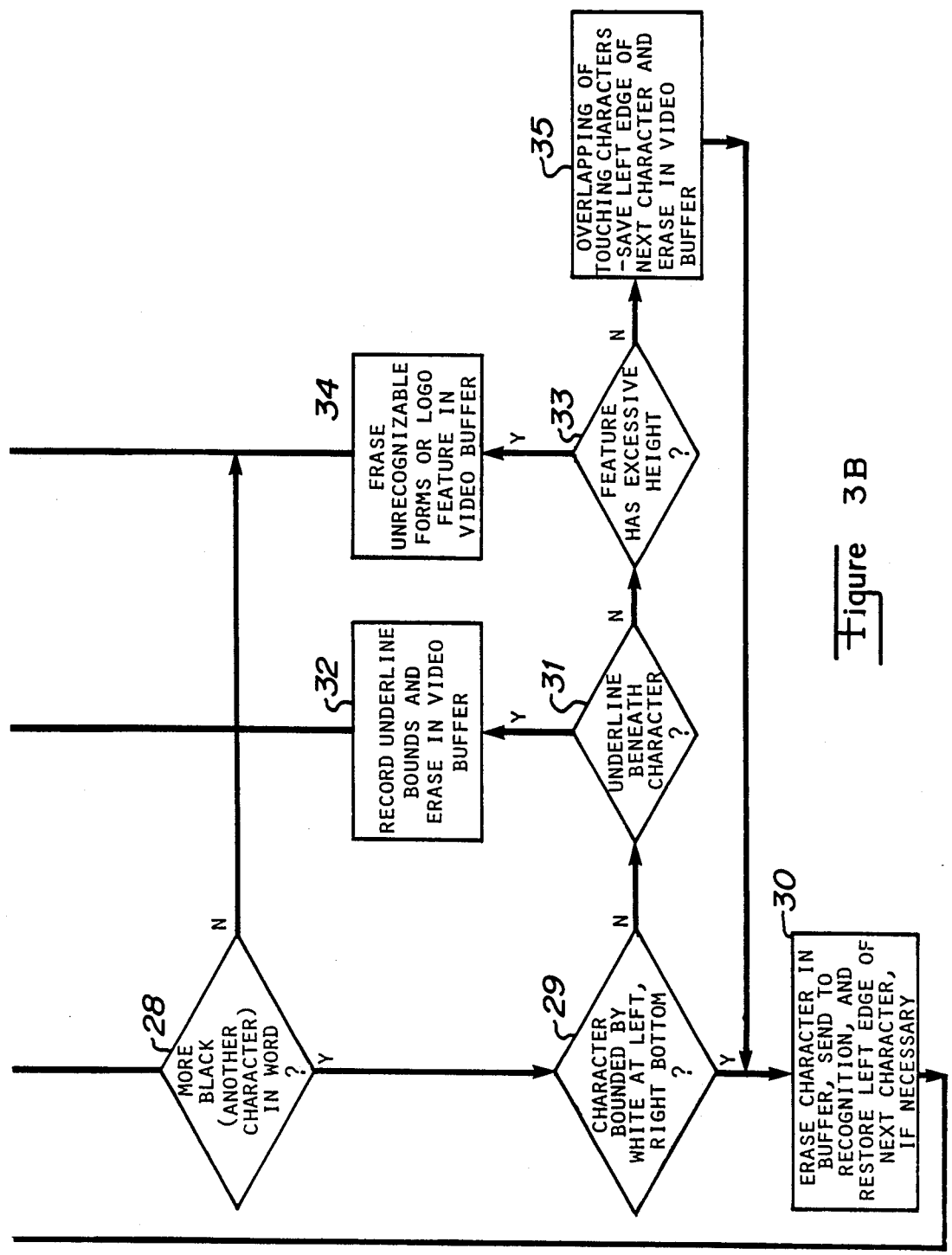

Thus, referring to FIG. 2, there is shown a pictorial representation of the data signal equivalent bit pattern in the buffer memory 17 corresponding to the typed word "voice" being scanned. It should be noted that the buffer 17 therefore represents an electronic "window" that is moved down the page 9 from the top thereof (where a white-space margin may be encountered) until the topmost, left-most dark space 19 is encountered. Here, the processing for isolation and recognition commences with an analysis of such dark space to determine whether it is noise (in a manner described in detail later herein) or whether it is part of a recognizable character. If such dark space 19 is recognized as a character (for example, by conventional means commonly described in the literature), then the left-most edge or beginning of a continuous, contiguous collection of characters that is presumed to be a word is detected at the left-most location 21 where a column of white space (in place of a character) is detected. Each character in such contiguous collection to the right-most edge (where a column of white space 23 is detected in place of a character) can then be recognized and identified thereafter by its ASCII equivalent code. Thus, one word is isolated and recognized in a line of typed text by the characters that comprise the word, commencing with the topmost dark space first encountered in the scanning direction.

It should be noted that if the first dark space encountered was not at location 19 but at location 25 due to skewed orientation of the word "voice" with respect to the scanning direction, then the isolation routine of seeking the left-most limit of the contiguous collection of recognizable characters would again isolate the word at the left edge of the "v" and the right edge of "e". Note also that the secondary recognitions of such features as sub- and superscripts, ascender and descender characters, underlying, etc., can also be isolated and recognized in this manner, as later described herein. During the isolation process, overlapping characters, touching characters, underlines, and oversized features are detected and processed. After each noise feature, word or oversized feature is processed, it is erased from the buffer 17 by introducing the data equivalents of white space in the locations of such features and the buffer is again moved down until the topmost row contains black. The entire page is thus decomposed into a series of noise, oversized features and character features without any requirement for locating word/line baselines or skew angles. Features are erased from the buffer after they are processed to assure that each feature is processed once and only once.

Isolating text by word (or portion of word) instead of by line thus provides these basic advantages, namely: (a) isolation problems caused by text skew can normally be ignited within a word; (b) a smaller video buffer can be used since a skewed line requires a taller buffer than an unskewed line but a skewed word is not significantly taller than an unskewed word; and (c) individual words do not normally touch other words, whereas individual characters often touch other characters within a word, and individual lines often touch other lines or unrecognizable features. Therefore, isolation by word according to the present scheme is easier and less prone to error than isolation by line or character.

Thus, the above-described scheme uses the video buffer 17 as a window onto an input document 9 to accumulate a digitized image of a portion of the document which contains recognizable typed text along with unrecognizable features such as noise, forms features, letterheads, logos, underlines, and signatures. The video buffer 17 must be "taller" (that is, include broader bit memory space) than the tallest recognizable character and must be wide enough to contain the entire width of the document 9 to be processed. The top pixel row of the video buffer 17 may be discarded and a new pixel row added to the bottom of the buffer, in effect moving the buffer window down the document 9 to be processed. Any pixel within the video buffer 17 may be examined to determine whether it is noise or a correlated bit of a character and may then be altered or erased when the recognition is completed.

The primary feature of this scheme is a series of recognition inputs, each containing a digitized image of a localized feature assumed to be a single character which is therefore known to have certain horizontal and vertical pixel locations, baseline, ascender or descender features, and the like. This scheme also identifies the location and length of any underlines detected, as well as location and size of features too tall and wide or too small and narrow to be considered characters.

Figures 1, 13A:
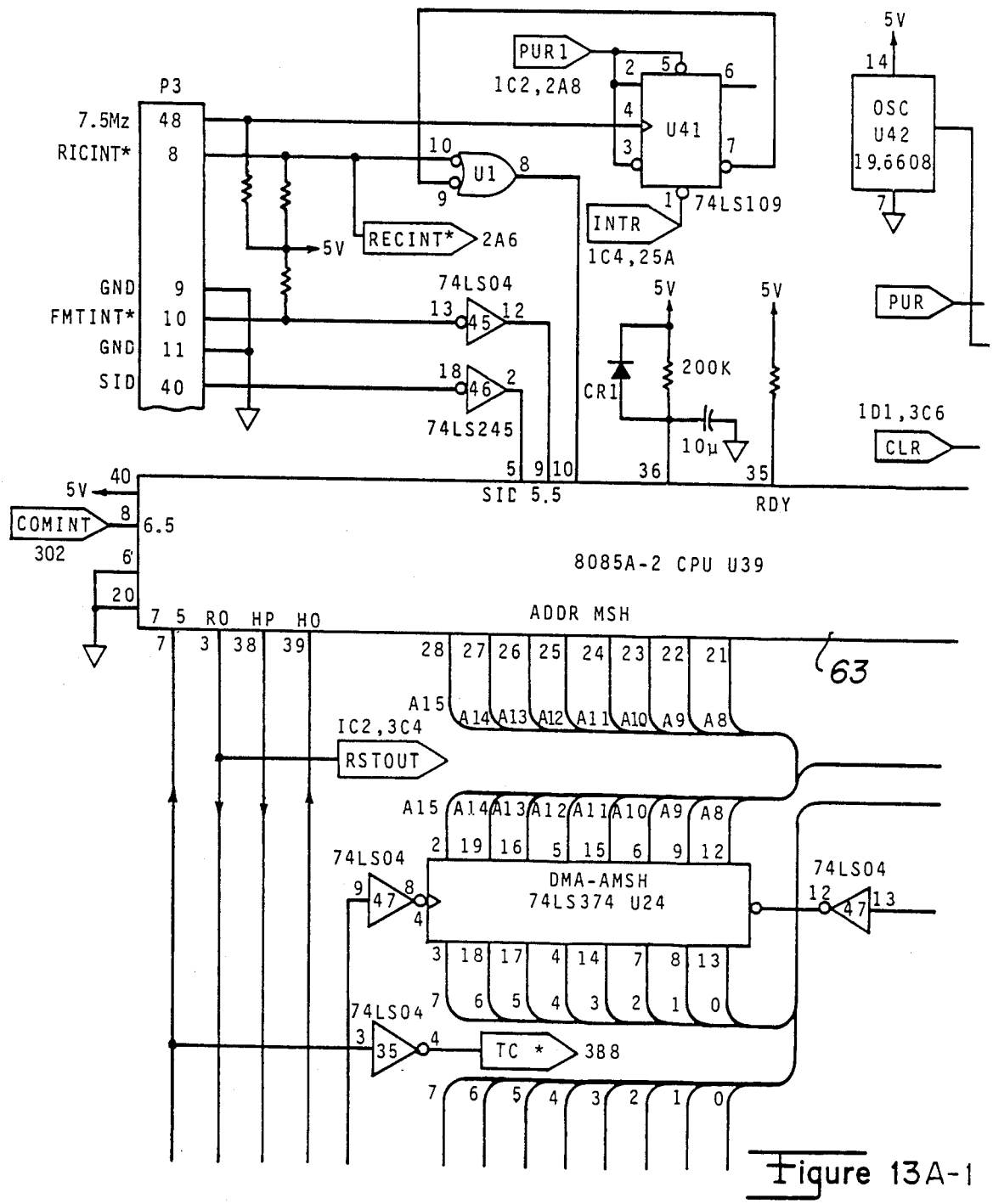
Figures 2, 13A:
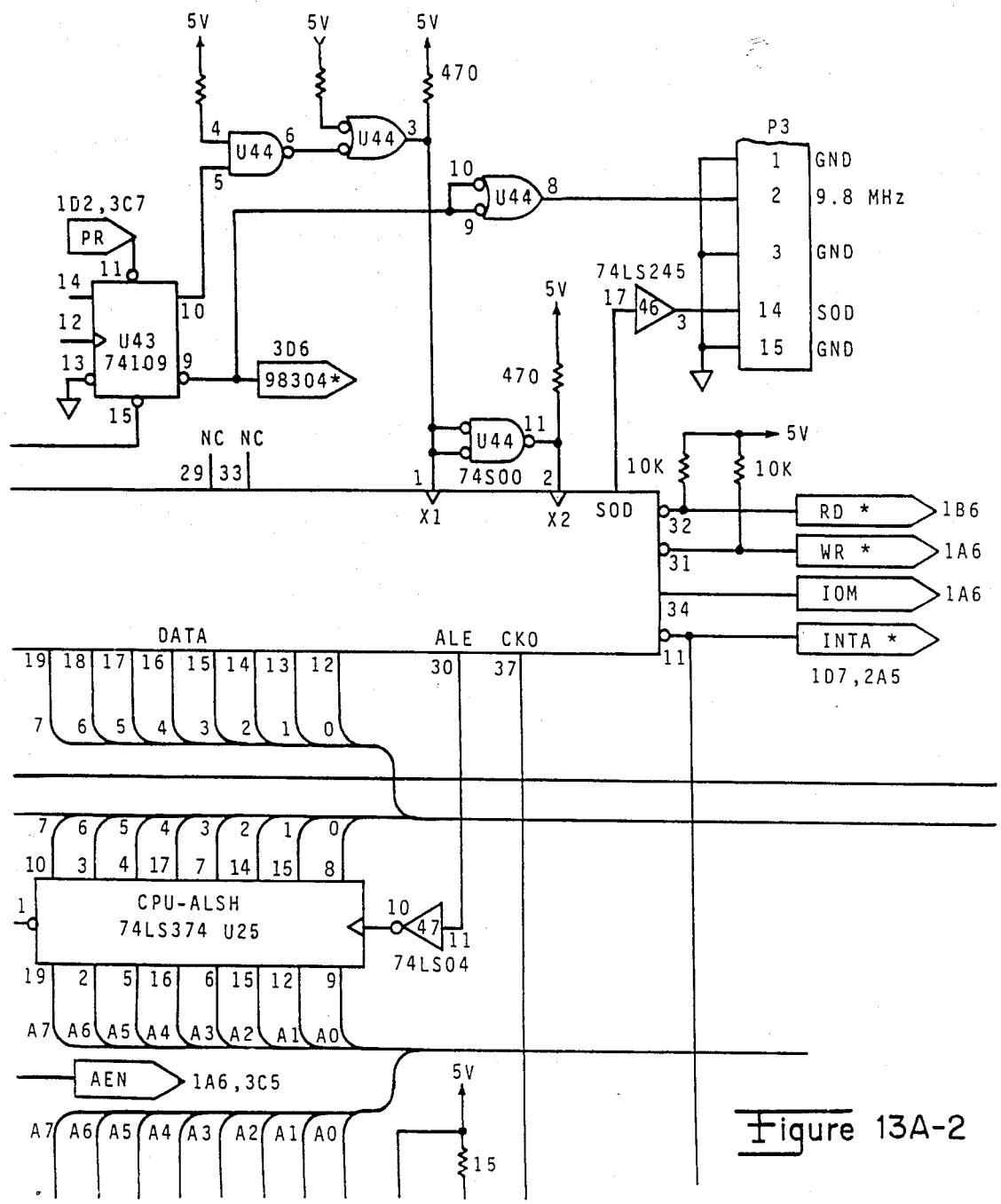
Figures 3, 13A:
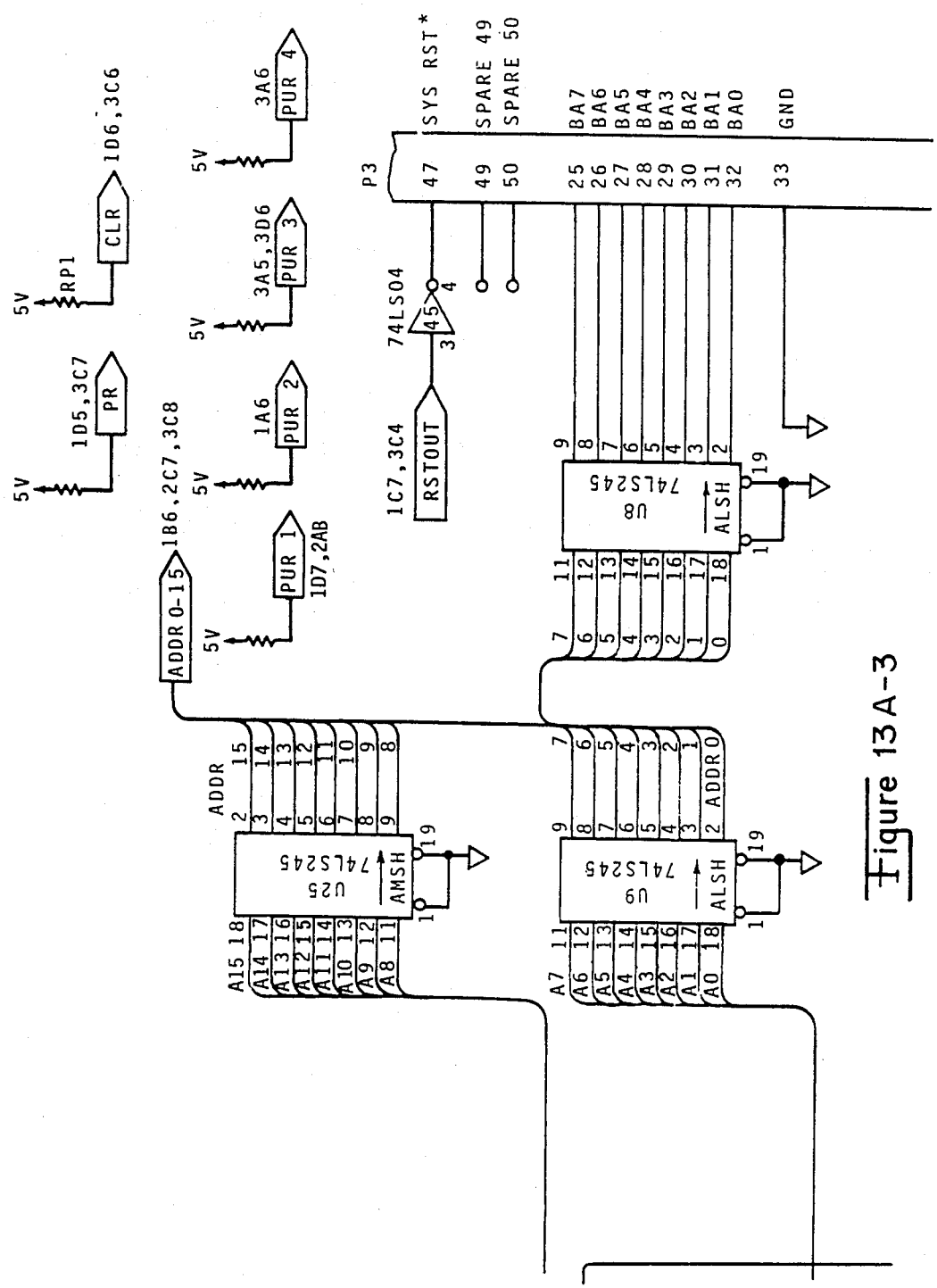

Referring now to the flow chart of FIG. 3, the character isolation technique is initiated when a new page 9 is detected by the video scanner 13. The video buffer filling process 21 is controlled by the character isolation technique as necessary (1) to discard one or more pixel rows from the top of the video buffer and/or (2) to insure that the video buffer 17 contains a sufficient number of pixel rows to allow the next isolation operation. If top video buffer row is white 22, it is discarded 23. The top pixel row of the video buffer is examined (within user-definable margins) for the presence of one or more black pixels. If no black pixels are found, the video buffer fill process is called to discard the top pixel row 23 and insure that at least one more pixel row is ready for processing.

After each pixel row is discarded 23, an end of page test is performed 24. End of page may be detected by a separate end of page sensor or by examining data within the video buffer. If no end of page is detected, the next, new topmost pixel row is examined again 22.

Figures 4, 13A:
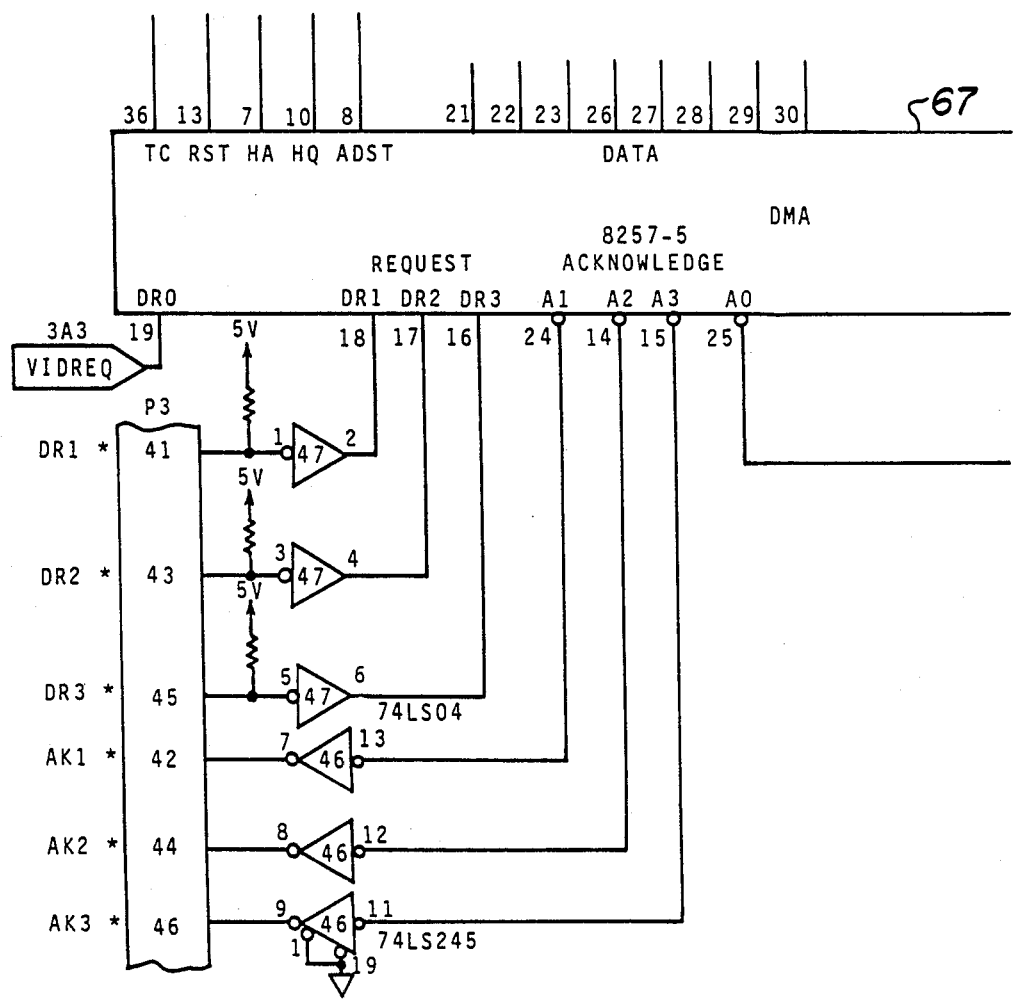

Since input documents often contain small, isolated black pixels ("noise") which could cause errors if procesed as character data, all black features are processed 26 by a noise filter. With reference to FIG. 4, the left-most black pixel on the top pixel row is located and the black pixels within an integration region ($R_I$) centered on the topmost black pixel are counted. If the total black count within $R_I$ is less than some noise threshold ($T_N$), then all pixels within a second region ($R_e$) contained within $R_I$ are erased. $T_N$, $R_I$, and $R_e$ may be selected so that features the size of a small period or larger are retained, and so that even small features in the neighborhood of large black features (as may occur with broken characters) are retained. If noise is detected and erased, the top pixel row is rechecked for more black 25. Otherwise, the feature containing the left-most black pixel in the top row is considered valid, and is processed as part of the word-framing routine 27.

The word-framing routine 27 does not require scan from left to right across a text line, but instead iteratively locates and erases each topmost "word" to decompose a page. Thus, it is necessary to locate the left end of a "word" given only the location of one pixel within the "word" (in this case, the left-most black pixel on the top pixel row). Note that a "word" as used herein does not necessarily contain recognizable text: it is merely a well-isolated collection of contiguous black regions used as the basis of further isolation of what are assumed to be normal characters. The left edge of a word is bounded by a white column which may be considered to be half the width of a character, and extends down from the top of the buffer the height of a character. If no word origin can be found within, say, about 20 characters to the left of the topmost black pixel, the first white pixel column to the left of the topmost black may be used.

The right end of a word bounded by a white column (which may have the same dimensions as the left end column) is now sought 28. When the right end of a word is detected while scanning for further characters to isolate, the topmost row is again examined 22 for further black. Note that the word-boundary criteria are not critical as long as the word bounds are wide enough to prevent splitting characters, such as at a double quote. An English word may be split into two or more "word" features or portions without loss of meaning or other harm, since the characters in the "word" feature will be spliced back together at page reconstruction time, later described.

Once the left end of a word has been detected 27, character isolation proceeds by iteratively locating, reporting to recognition, and erasing each character of the word, from left to right. In the normal isolation case, each character is bounded on all sides by white, and character bounds can be easily detected 29. Otherwise, the character bounds have to be calculated using more complex techniques, later described. In the character isolation scheme, the white-bounded character test should be optimized to run as quickly as possible (and this will determine overall isolation speed) since touching characters occur only rarely in good quality typed text. White-bounded character isolation speeds in excess of 200 characters/second can be achieved using contemporary technology.

Figures 5, 13A:
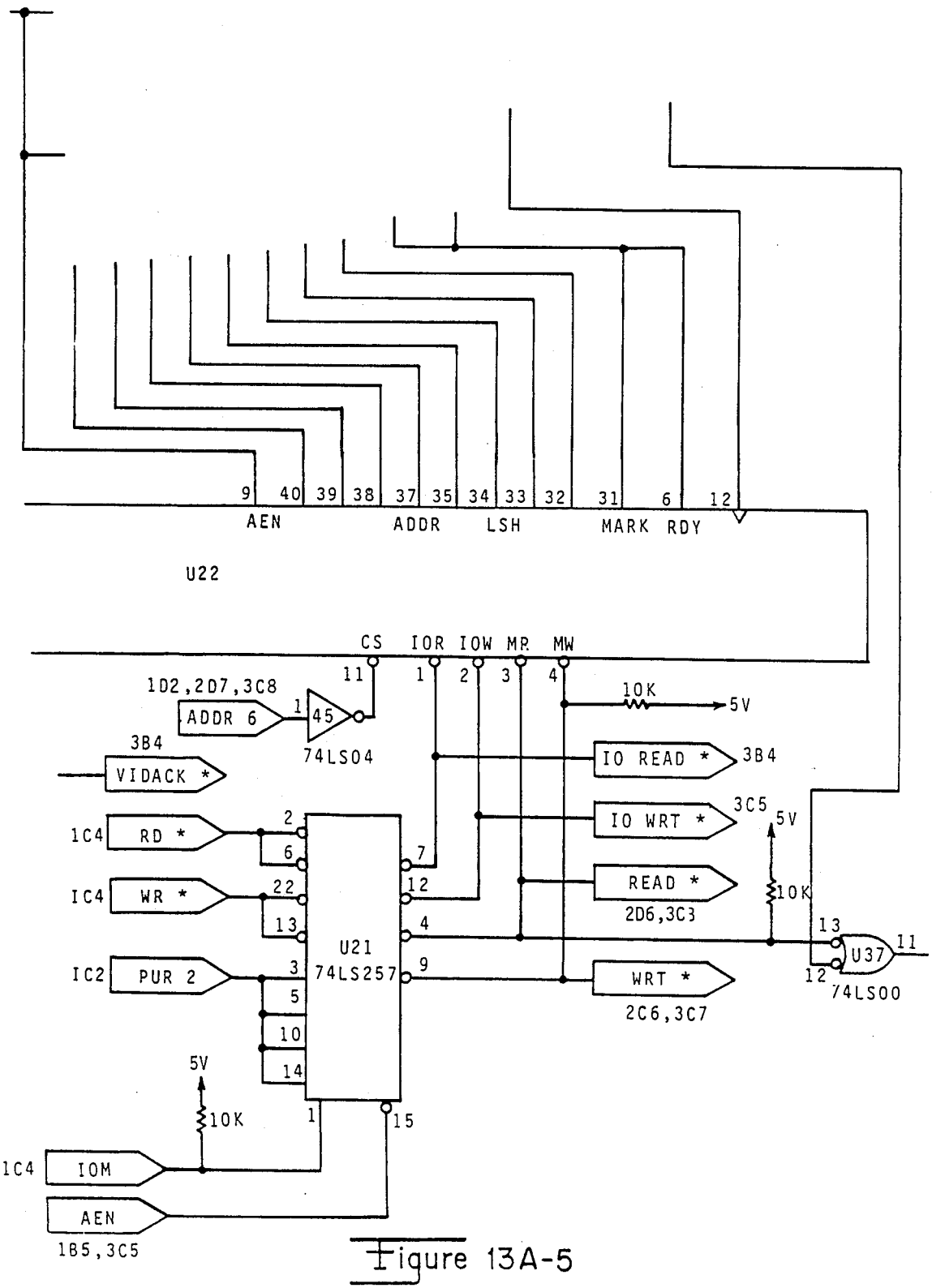

Once the bounds of a character have been determined, it is copied 30 into a recognition buffer, as shown in FIG. 5, along with its X and Y pixel origin on the page, ASCII values, etc., and is then erased from the video buffer 17. Any portion of an overlapping or touching character which was removed from the video buffer 17 to facilitate isolation of the target character is then restored 35. After reach character is processed, the character to its immediate right (if any) is processed 28.

Figures 6, 13A:
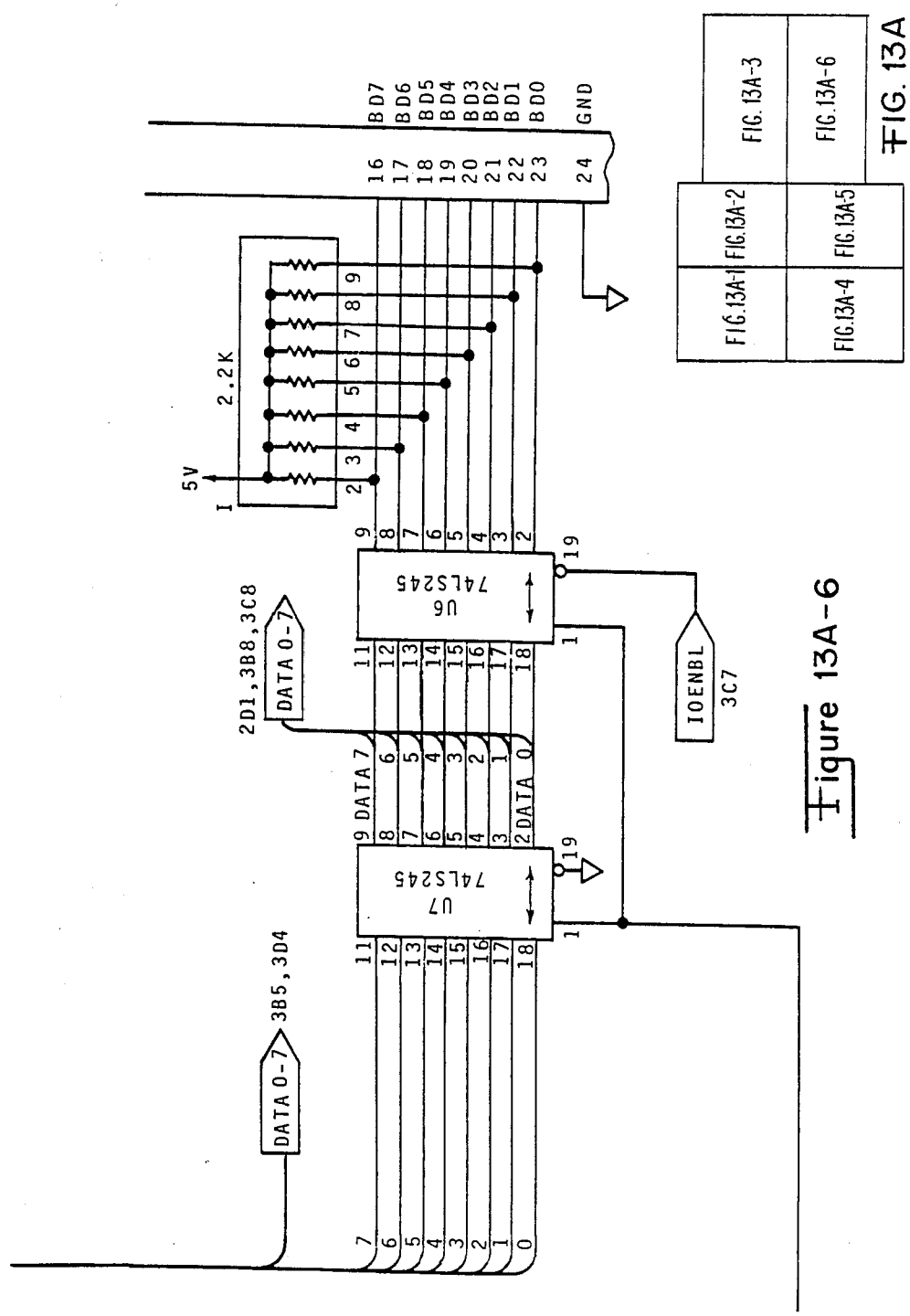
Figures 1, 13B:
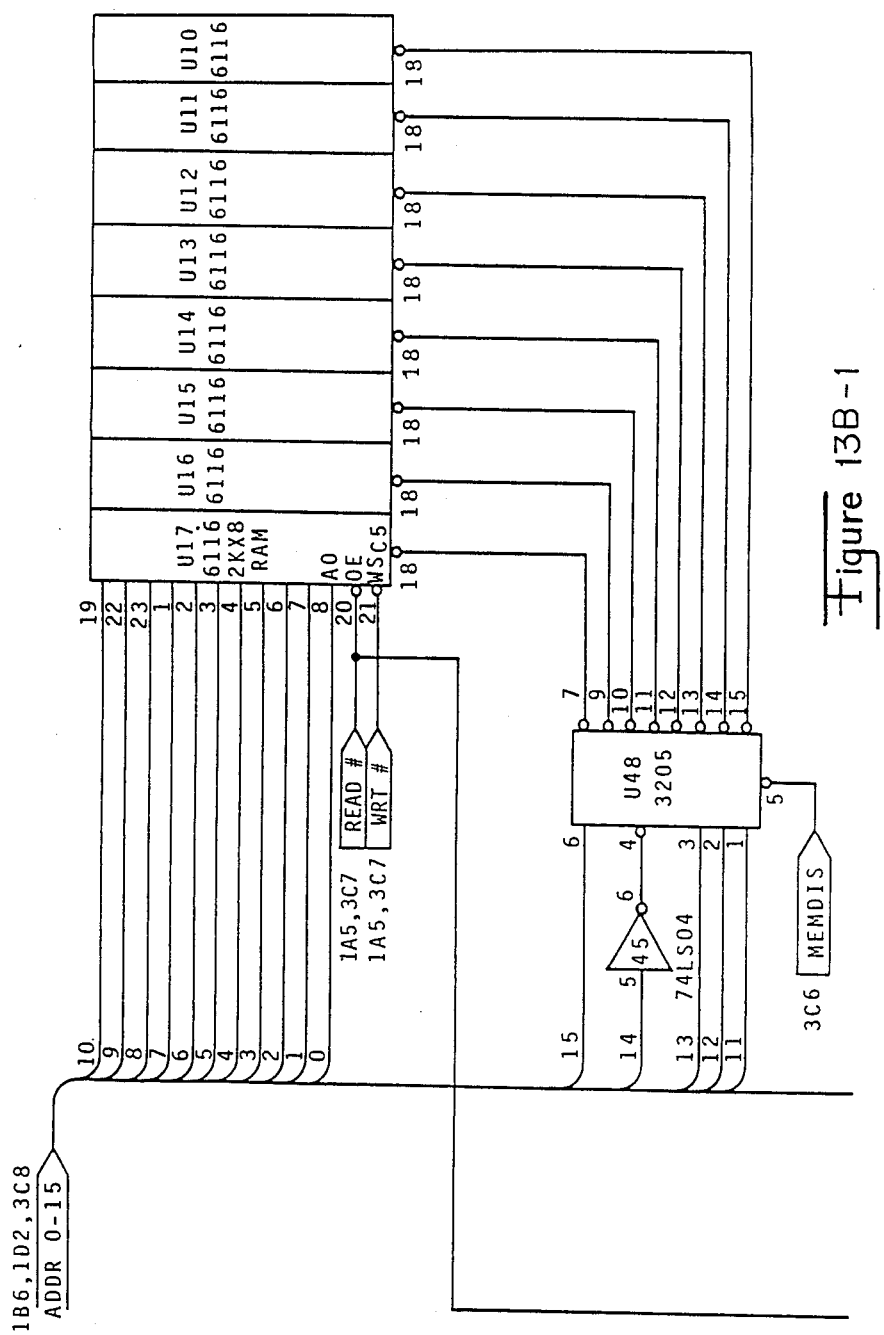
Figures 2, 13B:
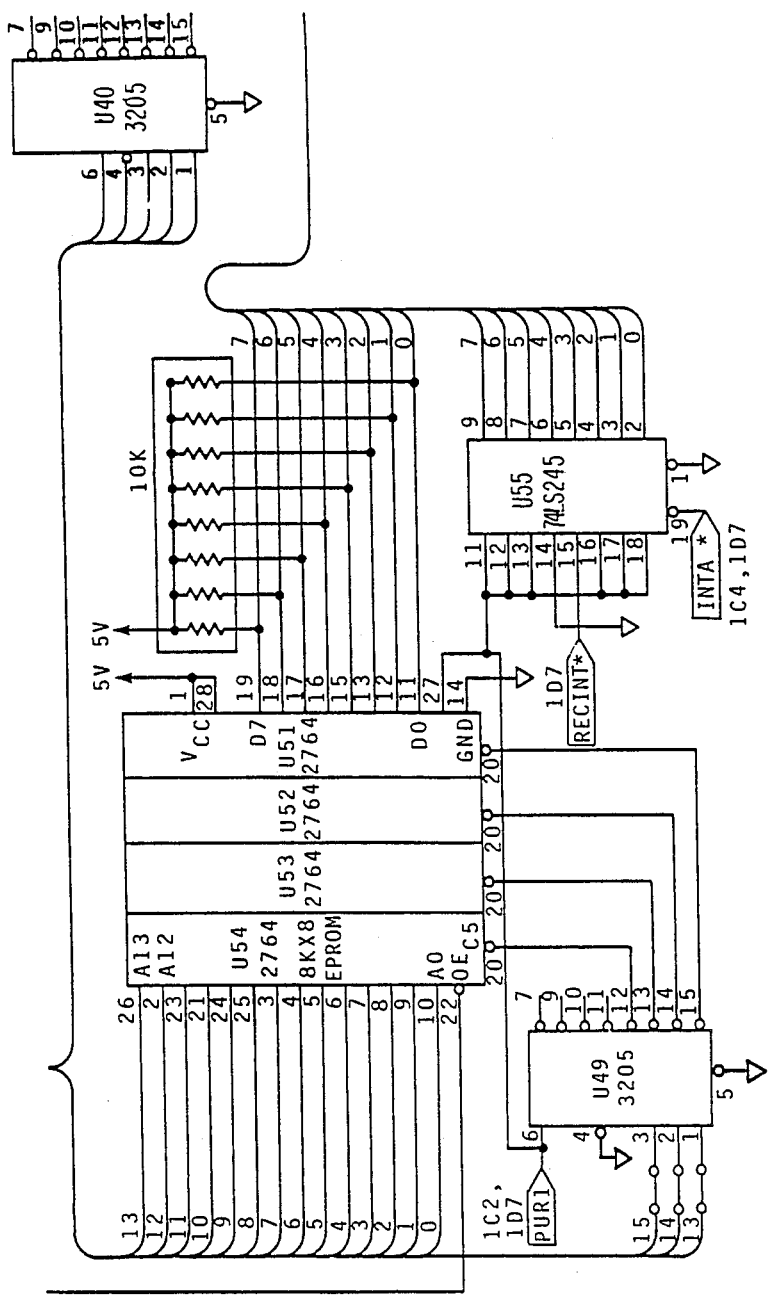
Figures 3, 13B:
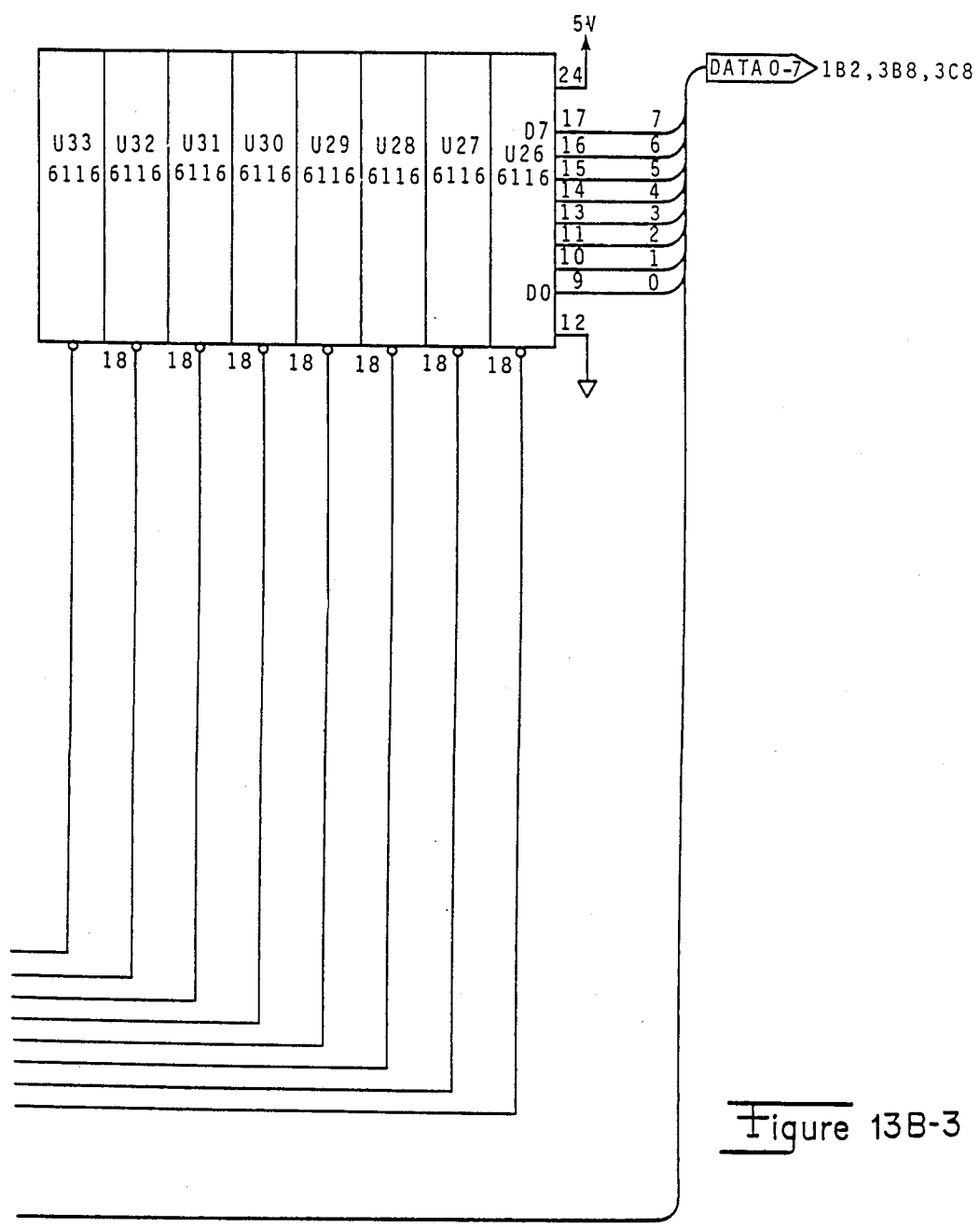
Figures 1, 13C:
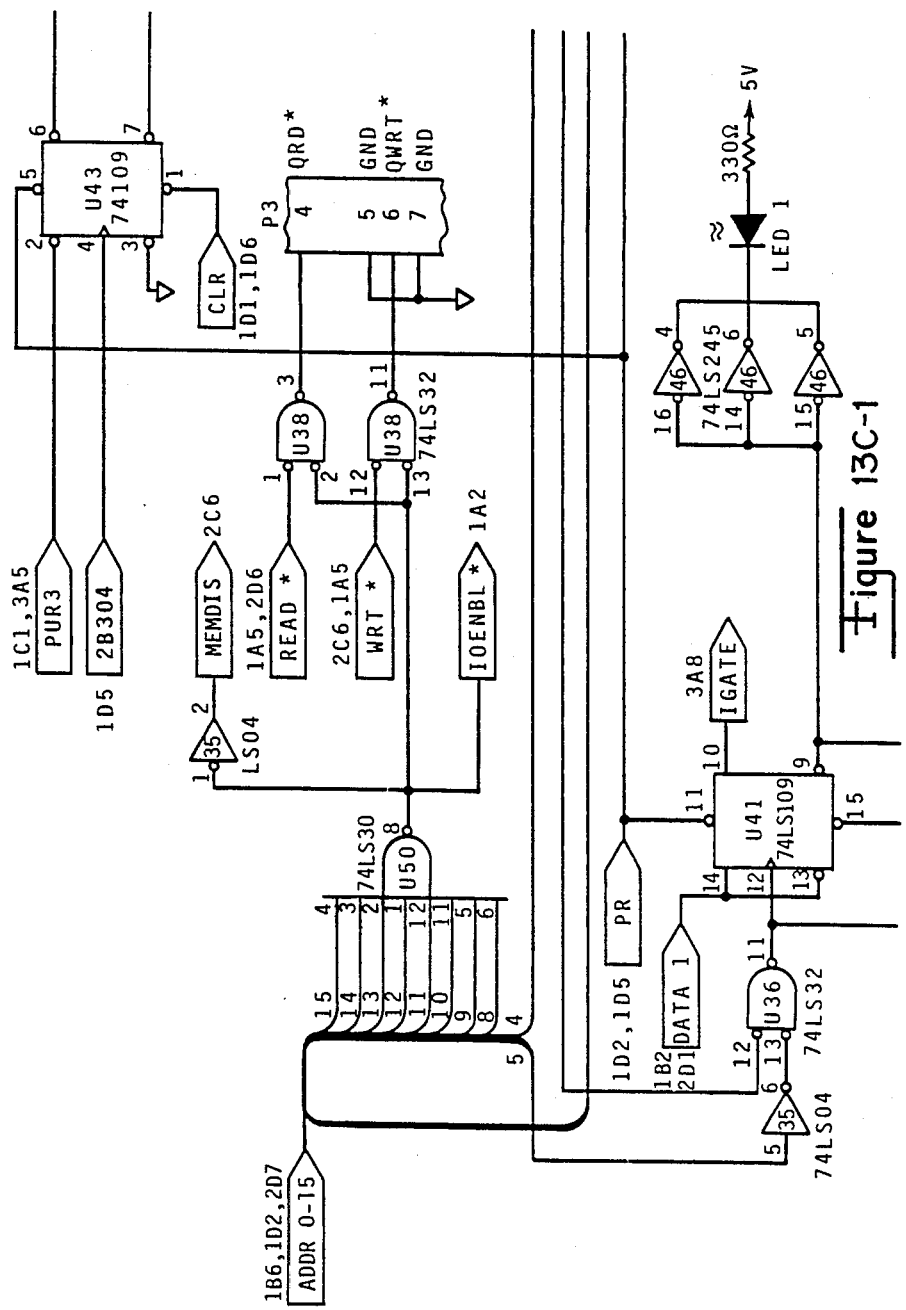
Figures 2, 13C:
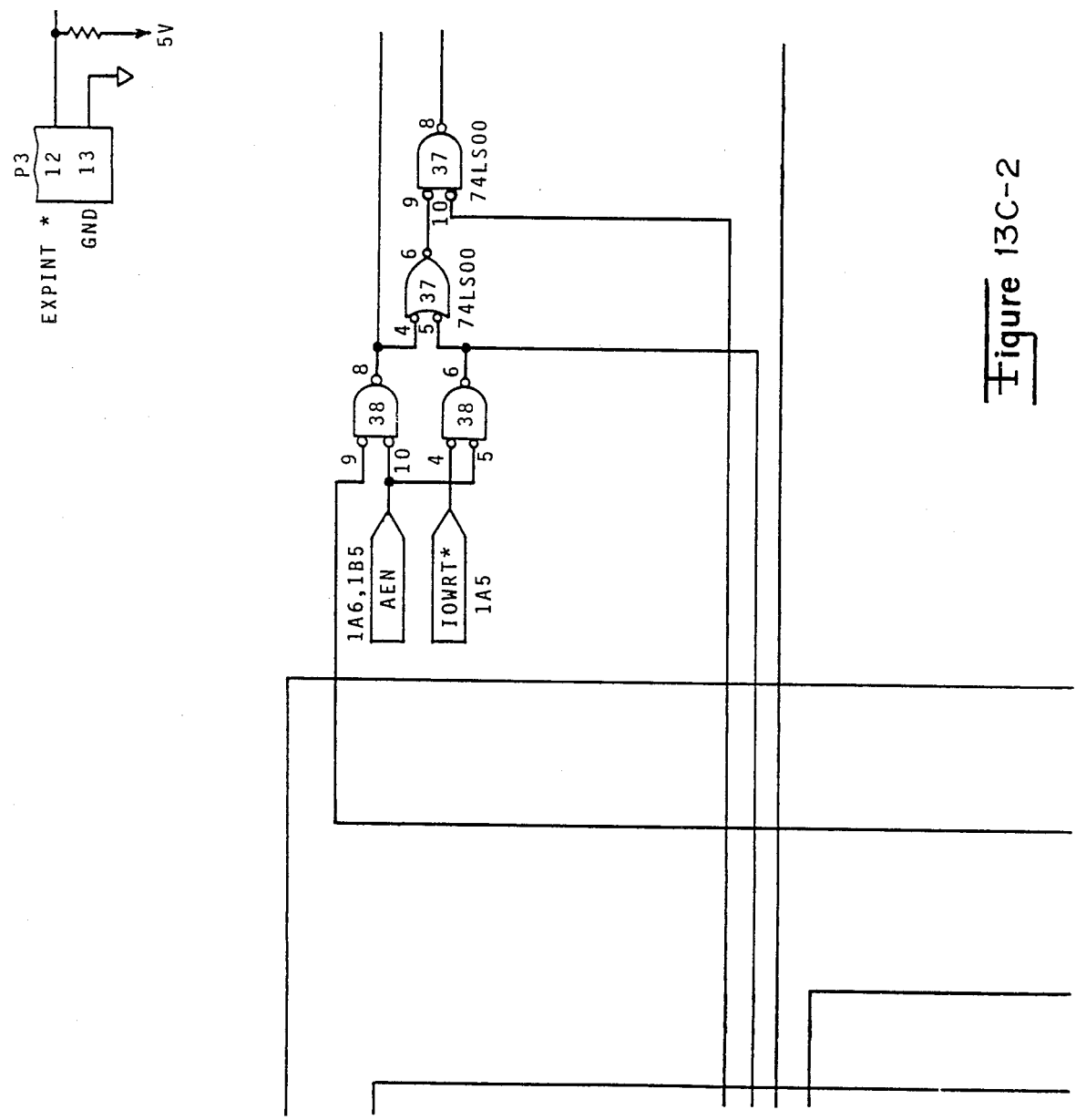
Figures 3, 13C:
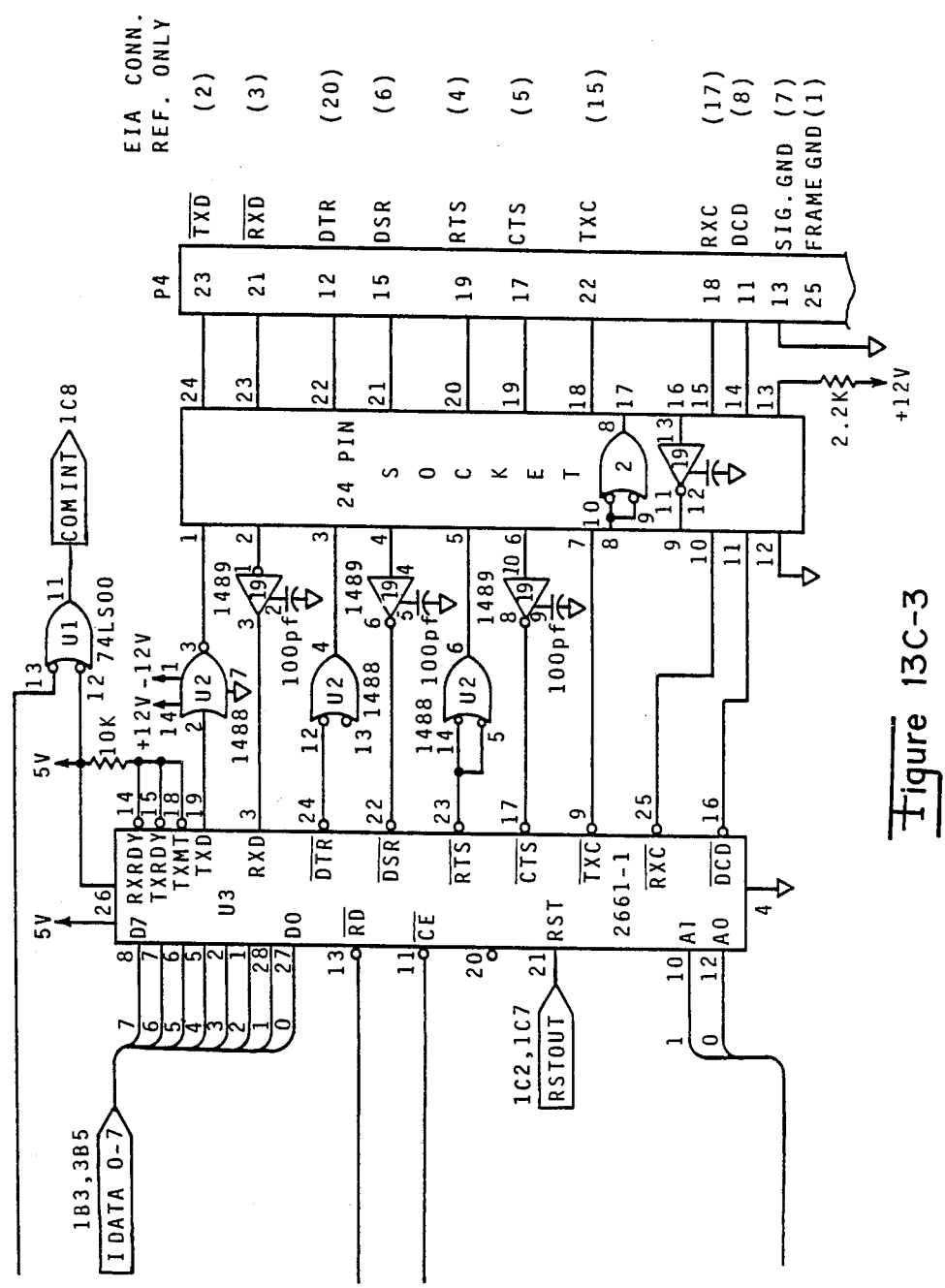
Figures 4, 13C:
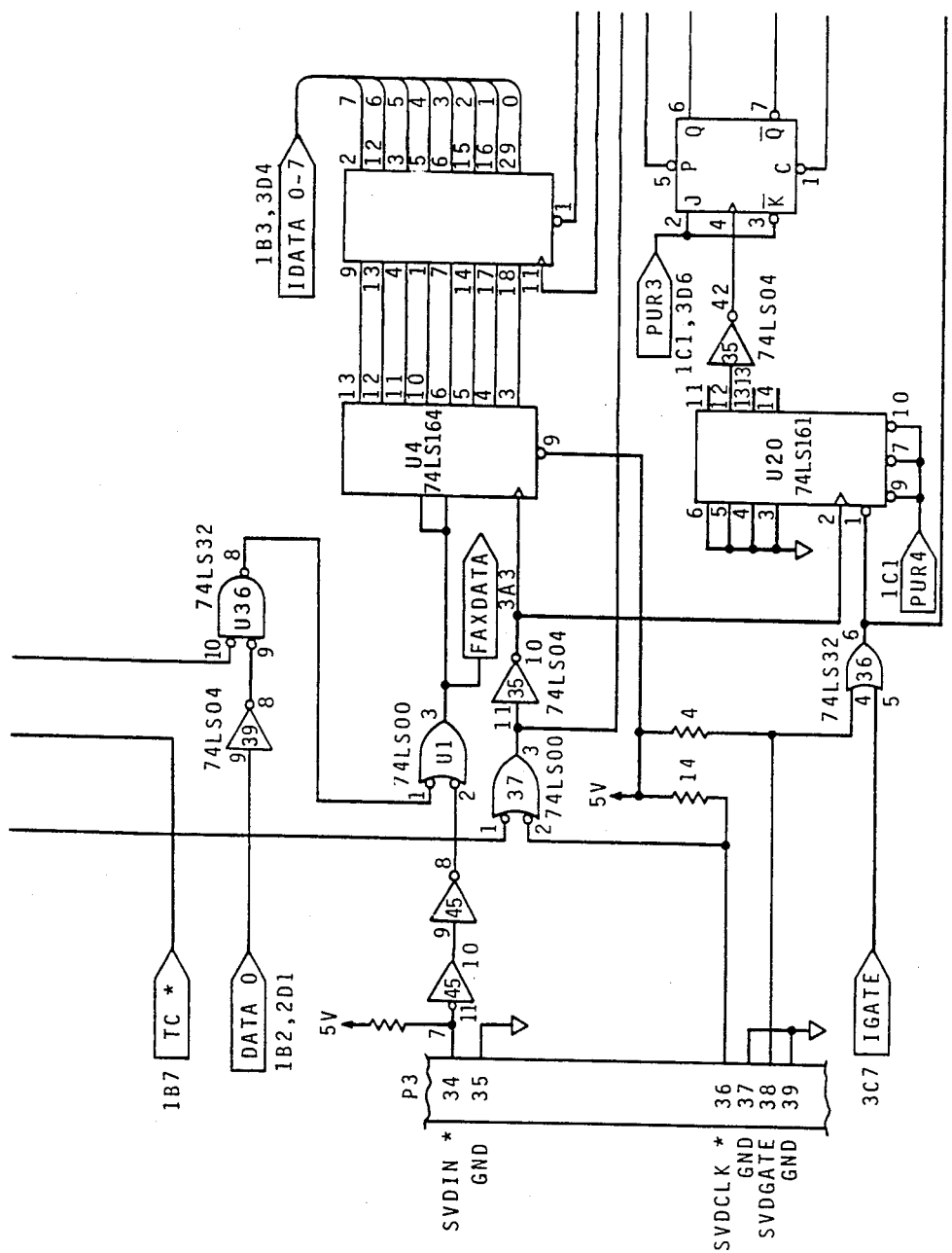

If no white pixel column can be found between two adjacent characters, the problem may be caused by an underline beneath the characters. If an underline is detected 31, its bounds are recorded 32 for the page reconstruction process, the underline is erased, and character isolation 28 is restarted to proceed to the end of word test. The underline detection and removal proceeds as illustrated in FIG. 6. One or more possible underline base points may be selected on the basis of the horizontal density of the detected underline. Each possible underline base is then traced both left and right until the potential underline ends (i.e., is interrupted by a white pixel column which is at least N bits wide). As the potential underline is traced, a count of irregularities may be increased by the relationships:

(a) [Underline top] minus [underline base] minus [maximum acceptable underline height] times $C_1$ (if greater than zero); or (b) [Absolute value of (previous underline top column minus current underline top column)] minus [maximum top variance] times $C_2$ (if greater than zero); or (c) [Absolute value of (previous underline base column) minus (current underline base column)] minus [maximum base variance] times $C_3$ (if greater than zero); or (d) [Underline gap width] times $C_4$, where $C_1$–$C_4$ are constants.

If the potential underline feature thus located is two or more characters wide, and the count of irregularities divided by the underline pixel length yields an acceptable irregularity count per unit length, then the feature is considered an underline kernal. The end points of the underline kernal are then extended until a wider white pixel column $N_{UE}$ is detected. The underline bounds are thus recorded and the underline erased 32 from the video buffer.

In cases where character descenders partially overlay the underline, as illustrated in FIG. 6, then it is important to remove the underline while doing the least possible damage to the character. This is accomplished by erasing the underline from right to left. As each underline pixel column is erased, a weighted running average underline top and bottom is calculated. If the current top or base varies from the previous average top or base by more $V_N$ pixels, a "touching character" mode is entered, and persists for the width of one character, at which time it reverts to the "normal" underline removal mode. In "touching character" mode, only that part of the underline feature which falls between the previous average top and bottom is erased, and the average top and base are unaltered (unless the current column top and base vary from the previous average top and base by less than $V_T$ pixels, where $V_T$ is less than $V_N$). The "touching character" mode thus preserves any part of the touching character which is slightly higher than the previous average underline top, while the "normal" variance $V_N$ erases the entire underline even when considerable vertical variance is present. The underline removal scan proceeds from right to left to allow all characters with descenders, including "g" and "y", to trigger the "touching character" mode with a vertical stroke before the underline overlaying horizontal stroke is encountered.

Note that single character underlines which are not identified by this technique may be processed in separate isolation or in recognition processing. Since underlines are infrequent in normal text, this underline isolation and erasure technique 31 may be initiated infrequently without significantly delaying total page processing.

If the underline test 31 fails and the feature is taller than the maximum allowable character height 33, then the feature is either an unrecognizable form or logo feature, or a recognizable feature that is overlaid by noise or form features. If the noise or form feature overlaying a word is narrow enough (as determined by horizontal black pixel totals) to be distinguished from the word, it is erased 34 and isolation continues. Otherwise, the entire feature is erased, and its positioned noted for future reference. In either case, character isolation continues with the analysis 22 of the next top white row.

If no underline is found 31 and the word is not vertically oversized 33, it is assumed that the first two or more characters of the word either overlap or touch 35. The processing is similar in both cases, as illustrated in FIGS. 7a and b, respectively. First, the expected cut point (ECP) is to be one-half the feature width for features about two characters wide, one-third the feature width for features about three characters wide, and the nominal character width for wider features. A cut zone region is established as $\pm N_{CZ}$ pixels around the ECP and this zone is then examined for character overlap or touch. If a continuous white vertical/diagonal pixel path can be detected from the top to the bottom of the cut zone, for example, by tracing from the top to the bottom of the cut zone, then the character is overlapping and is cut along the white path. Otherwise, the character is touching and is cut along the cut zone pixel column with lowest black count weighted to favor cuts near the ECP, as illustrated in FIG. 7b. In either case, the right side of the cut zone is saved and then erased from the video buffer 17 to create a white boundary for the character to the left 35. After the left-most character has been isolated and erased, the right side of the cut zone is restored 30 in the video buffer 17 and isolation continues 28.

The above isolation and processing continues until the end of the page is detected 36 and the isolation technique is completed. Thus, the entire page has been decomposed by words into a collection of character, underline, small noise, and logo/form features. The page images can then be reconstructed by baseline analysis of the character codes and positions that were produced by the recognition process. This page reconstruction technique (by baseline analysis) depends upon the series of character recognition buffers, as illustrated in FIG. 5, each of which includes data identifying the best fit and next-best fit ASCII value and correlation score (less likely characters and scores may also be used) as well as the X- and Y-axis pixel origin of the character. Secondary inputs may include records describing underlines and forms/logo features as well. With reference to the flow chart of FIG. 8, it should be noted that the page reconstruction technique yields an ASCII data string which may be transmitted or used to drive a display or printer that can accurately recreate the images on the original page 9 based upon the ASCII values. Secondary outputs can include escape sequences embedded in the ASCII data string which describe underlines and forms/logo features and origin and size and exact line X-Y origins and exact page length and rejected and post-processed characters. The characters thus displayed or printed will be devoid of any original skew problems on page 9 and will, of course, appear when thus displayed or printed with the font style and features associated with such printer or other display device.

Figure 8:
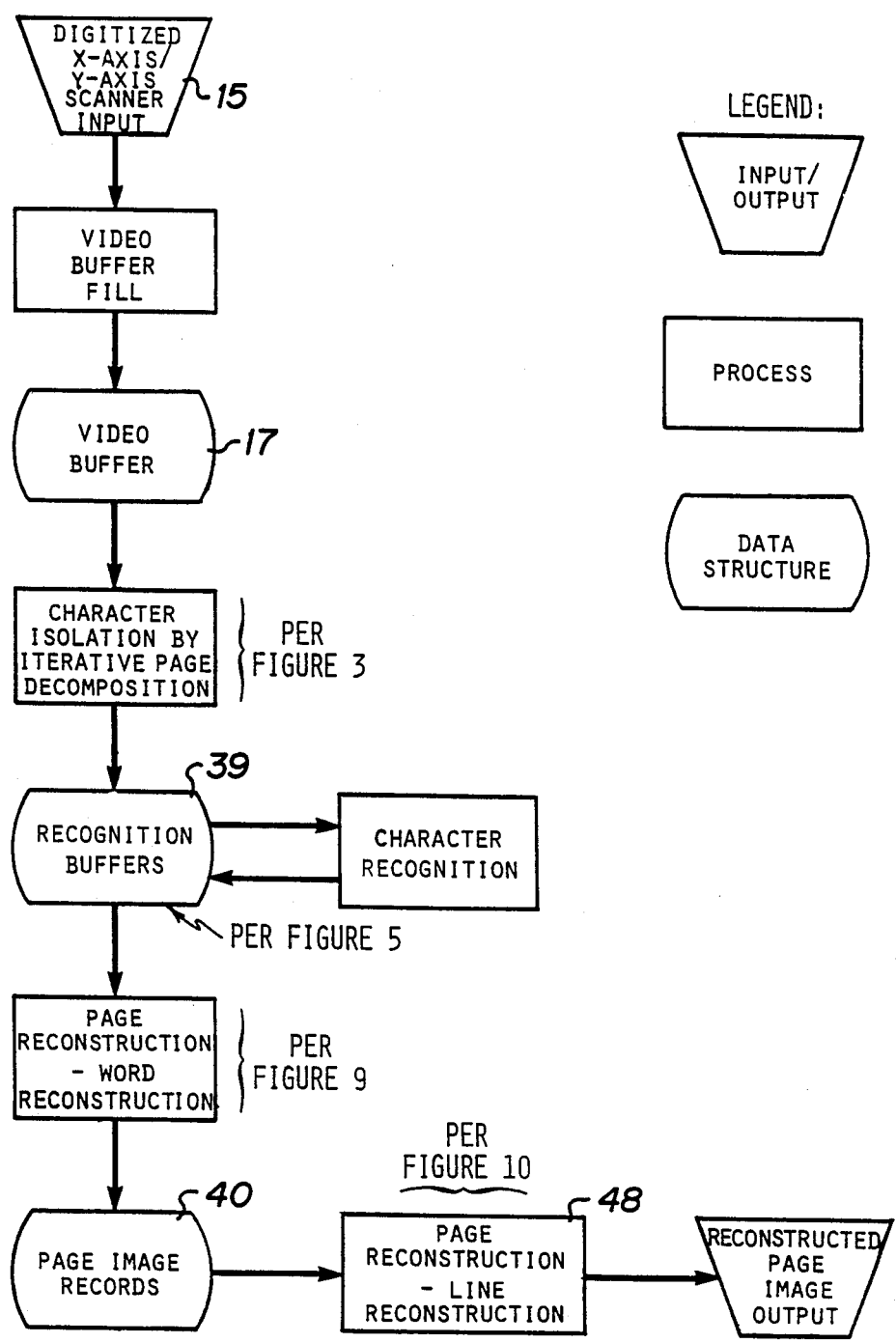
FIG. 8 is a flow chart illustrating the page-reconstruction processing.

More specifically now, the page reconstruction technique using character baseline analysis involves two aspects, namely, word reconstruction and line reconstruction. In word reconstruction, characters arriving in recognition buffers 39, as illustrated in FIG. 5, from the recognition process are built back up from coordinate data into words and stored in page image records (PIR) 41, as shown in the chart of FIG. 8. This is done primarily to allow more efficient usage of system memory. Since every page image record 40 must contain several bytes of position and linkage information, it is desirable to store as much ASCII information as possible in each page image record, as shown in FIG. 11. Also, since characters are normally isolated from left to right within a word and processed by recognition in the same order, word reconstruction thus constitutes the process of testing to determine if each successive input character is to be appended to the end of the current page image record. If a word ends or if a page image record fills, the old page image record is linked to the new, active page image record to form a chain in ascending, horizontal word-origin order as illustrated in FIG. 11, and a new page image record is allocated from a free page image record chain, as illustrated in the chart of FIG. 9.

In contrast, line reconstruction is initiated when two or more lines of text are contained in the active page image record chain, or when the free page image record chain is empty. Line reconstruction may make two passes through the active page image record chain. In the first pass, the left-most page image record of the topmost line in the active page image record chain is determined. The second pass then starts from that left-most page image record and restores to the free chain all page image records on the topmost line, as illustrated in the flow chart of FIG. 10.

Briefly, then, as each ASCII character is added to a page image record (which tends to be an entire word), a baseline adjustment appropriate to that ASCII character is applied to the character's base point to yield a character baseline. Character baselines within a word are averaged to form a word baseline. This ASCII-calculated baseline is therefore more accurate than a baseline derived from examination of raw digitized video 15, since it is resistant to errors caused by random noise and extreme cases such as "soggy gypsum" which may cause a false baseline due to the occurrence of many descender characters. This accurate word baseline permits accurate positional post-processing of characters such as "P" and "p", as well as accurate detection of subscripts and superscripts.

Figure 9:
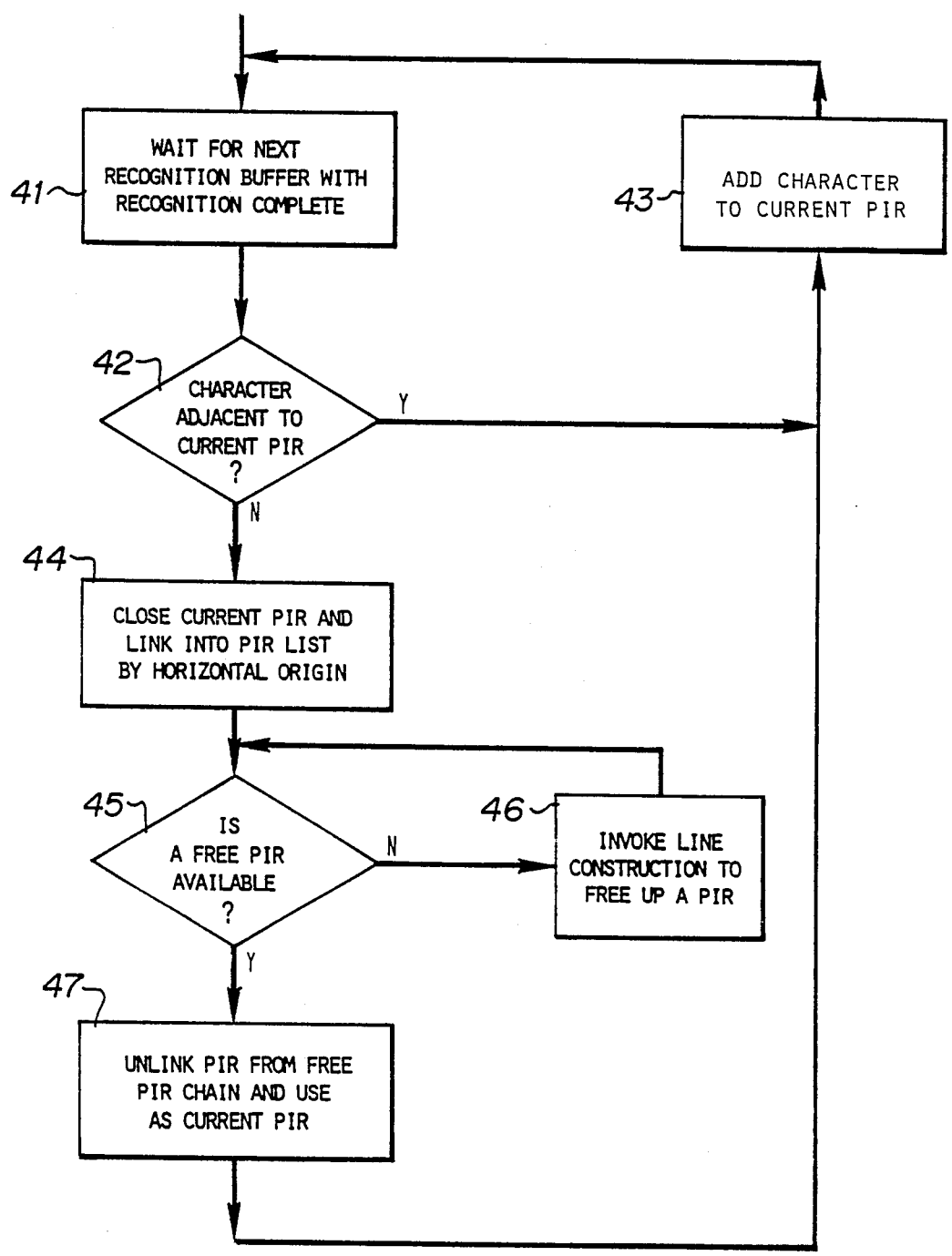
FIG. 9 is a flow chart illustrating the page-reconstruction processing of page image records.

Specifically, with reference to the flow chart of FIG. 9, the word construction process is initiated when recognition processing produces a recognition buffer 39. Word reconstruction proceeds by assembling the ASCII character into a page image record 40. The recognition buffer 39 may then be cleared for further use in the isolation and recognition processing previously described.

The new ASCII character may now be appended 43 to the end of the page image record (PIR) being assembled if: (a) the PIR is not full, and (b) the character is not flagged as a reject by the recognition process, and (c) the left edge of the new character is closely adjacent to the right edge of the PIR 42, as determined from the coordinate information of the respective characters, and (d) the character base, when biased by a baseline adjustment value appropriate to that ASCII character, is in close agreement within a selectable limit with the existing PIR average baseline.

In addition to ASCII characters, the PIR also contains the horizontal and vertical origin and size as well as the average baseline for the PIR. Information describing each unrecognizable character may be stored in a separate PIR.

If a new character cannot be appended to the current PIR because the above criteria cannot be satisfied, the current PIR must be closed out, a new PIR allocated, and the new character placed in the new PIR. The old PIR is closed out 44 by linking it into the active PIR list in ascending, horizontal word-origin order (with words from several lines possibly intermixed). A new PIR is allocated by taking the top PIR off of the free PIR chain. If the free PIR chain is empty, the line construction process is invoked to force out a complete line and free up the PIR's describing the line.

Referring again to FIG. 8 and to the flow chart of FIG. 10, the line reconstruction 48 by analysis of character baselines proceeds as follows:

Line construction searches through the PIR chain in two passes 51, 52, 53, 54 to prepare the uppermost text line. The first pass starts from the beginning of the active PIR chain, and locates the left-most PIR of the uppermost line on the basis of determined from the coordinate information of the respective characters, and (d) the character base, when biased by a baseline adjustment value appropriate to that ASCII character, is in close agreement within a selectable limit with the existing PIR average baseline.

In addition to ASCII characters, the PIR also contains the horizontal and vertical origin and size as well as the average baseline for the PIR. Information describing each unrecognizable character may be stored in a separate PIR.

If a new character cannot be appended to the current PIR because the above criteria cannot be satisfied, the current PIR must be closed out, a new PIR allocated, and the new character placed in the new PIR. The old PIR is closed out 44 by linking it into the active PIR list in ascending, horizontal word-origin order (with words from several lines possibly intermixed). A new PIR is allocated by taking the top PIR off of the free PIR chain. If the free PIR chain is empty, the line construction process is invoked to force out a complete line and free up the PIR's describing the line.

Referring again to FIG. 8 and to the flow chart of FIG. 10, the line reconstruction 48 by analysis of word baselines proceeds as follows:

Since the words contained in the PIR records are listed in ascending horizontal word origin order, with several lines possibly intermixed, reconstruction of the topmost line may be accomplished by locating the leftmost word of the topmost line in a first pass through the PIR chain and then selecting and outputting all PIRs in the same line as that leftmost word in a second pass. Note that every PIR in the PIR chain must be checked in the first pass since the last (rightmost) PIR may describe a one word line which is also the topmost line. Since the process of searching through the PIR chain for line reconstruction is similar in both passes, with only slight differences based on pass number, the two passes may be merged together using the pass number where needed to differentiate between the passes, as in FIG. 10.

First the pass number is set to one, and the topmost line origin is initially assumed to be the leftmost PIR 51. Each PIR in the chain is then examined 52 until the end of the chain is reached. When pass number indicates that the first pass is being completed (pass =1), then the leftmost PIR in the topmost line has been detected, and the second pass will output PIR data from that leftmost PIR 53, 54. When the second pass is completed, then the topmost line reconstruction is complete. As the search advances to the next PIR or the chain 55, the new PIR is examined to determine if it is a part of the current uppermost line.

If the baseline of the next new PIR is close to that of the last PIR in the current, uppermost line, such PIR is assumed to belong to the current line. In addition, if the new PIR is determined to be immediately adjacent to the previous PIR in the current line on the basis of coordinate information and one of the PIR's contains a rejected character record, positional post processing is performed 57. As previously noted, recognition buffers 39 include data about the best fit and next-best fit with respect to the character. ASCII baseline adjustment is added to both the best-fit and the next-best fit character baselines, and the resulting baselines are compared to each other and to the adjacent word baseline. If the best-fit and next-best fit baselines are sufficiently different, and one of the two baselines agrees well with the adjacent word baseline, and the correlation score for that character is acceptable, then the character with the correct baseline is selected, and the rejected character is removed. Thus, slight distortions in the shapes of Letter Gothic "9" and "g", for example, can render the two characters indistinguishable to recognition, but the baseline differences are easily deteted and utilized to more accurately assemble the word and associated baseline.

Since PIR's are searched from left to right by ascending horizontal word origin, if a new PIR is not in the current line but lies above the line 58, then the new PIR must be the left-most PIR in a higher line 59. When all the PIR's have been searched in this manner, PIR output to form successive lines starts from the left-most PIR of the uppermost line.

If the new PIR baseline is within one-half line of the current baseline, but not sufficiently close within selectable limits to the current baseline, then the new PIR is assumed to include either a subscript or superscript (depending on the sign of the baseline difference). Since ASCII-derived baselines are more accurate than feature-derived baselines, accurate sub- and superscript determination can thus be made, even in difficult cases such as "$Hg_2O_4^{(3)}$".

Since the limits of baseline variations can be selected, then any word-to-word baseline variances that are smaller than differences associated with superscripts or subscripts can be ignored, and the present page reconstruction scheme is therefore insensitive to line skew on the original page 9. Skewed or bowed lines can exceed the normal height of a line and still be properly deskewed as long as the baseline variances of neighboring words are acceptable. In addition, vertical-line deskewing is provided according to the present invention. The horizontal location (in pixels) of the first character of each line is compared to the horizontal location of the first character in the previous line, all with respect, for example, to the detected left edge of the page. The difference between the two locations is expressed as a number of whole characters in the current pitch, plus a residual value of partial-character spacing. The residual value is added to a horizontal line origin correction factor which is then applied to each horizontal line origin to establish the correct (adjusted) distance from the left edge of the page to the first character in a line. Vertical skew in line origins, even exceeding a full character width, which would otherwise result in a "stair-stepped" left margin can thus be removed according to the present invention.

Figure 12:
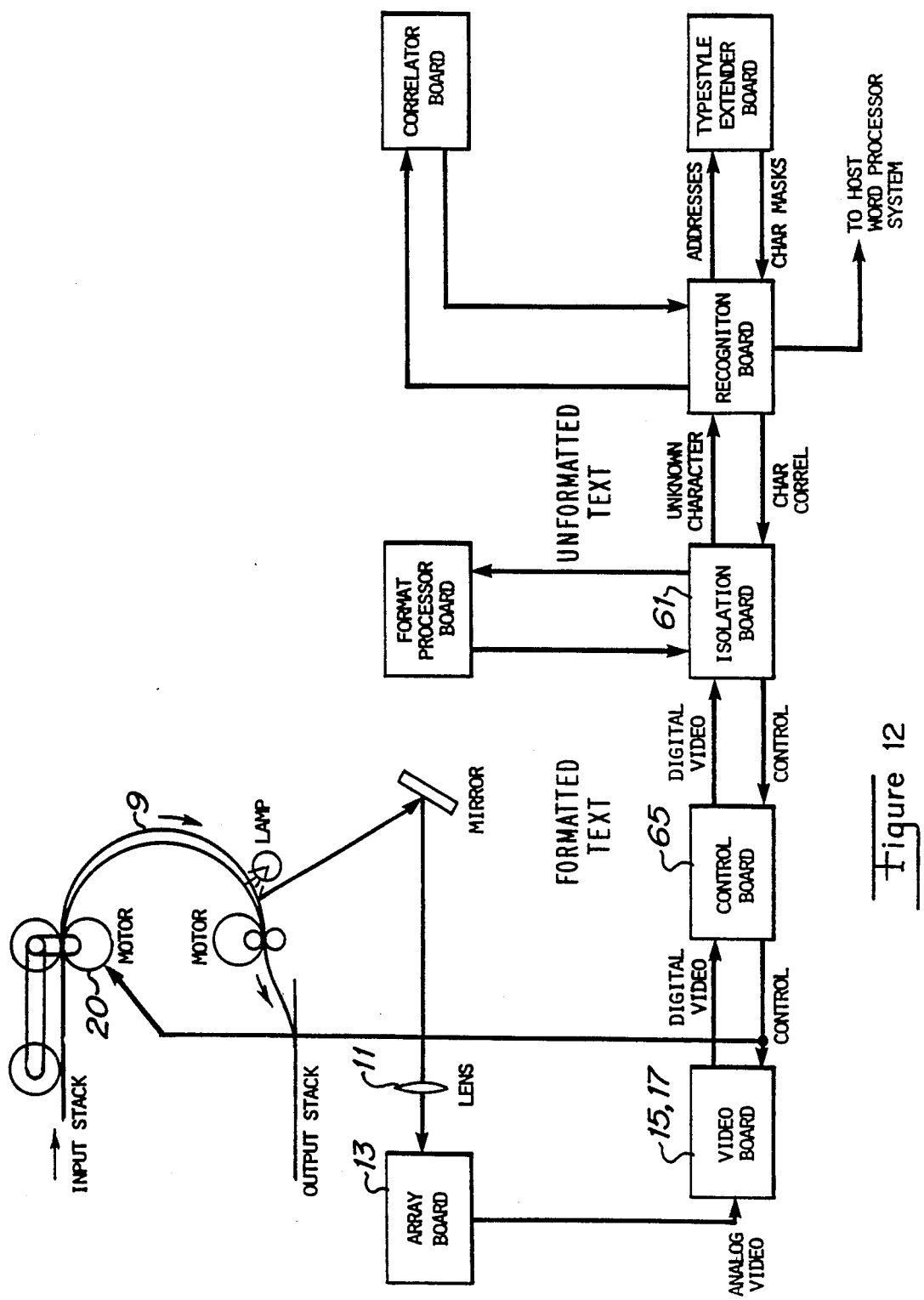
FIG. 12 is a schematic diagram of the illustrated embodiment of the present invention.

In operation, the character processor 18 of FIG. 1 includes an isolation module 61 and the circuitry of FIGS. 12 and 13a, b, c which controls the video acquisition in an independent, interrupt-driven manner. A controller-processor 63 in the isolation module 61 commands the motor 20 and video control logic 65 to cause a single 1/240" movement of paper 9 in the Y-axis direction. The step/scan command also initiates a complete scan of a 2048-element video array 13 which is focused 11 on a narrow image band perpendicular to the direction of paper travel to provide a horizontal resolution of 240 pixels per inch. The analog video levels scanned by the video array are then processed by dynamic video thresholding logic, for example, as described in the aforementioned U.S. patent application Ser. No. 452,494, to generate a string of 2048 binary (black/white) pixels. This pixel string is stored 8 pixels at a time (bytewise) in main video buffer memory 15 by a dynamic memory access (DMA) controller 67. The DMA occurs independently of isolation processing and reads a complete scan in approximately 3 milliseconds. When a scan is completed, an interrupt is generated by the DMA controller which activates the controller-processor 63 to initiate another step and row scan which will be placed in the video buffer 15 immediately following the previous scan row. This scanning process continues under interrupt control until the entire available data space in the video buffer 15 is filled with a digital image of the scanned rows on page 9. Scanning is then stopped until the processing deletes one or more scan rows from the top of the video buffer 15, at which time scanning resumes and continues until the video buffer 15 is again filled.

The video buffer 15 should ideally be at least large enough to store one unskewed line of text. Thus, at 6 lines of text per inch scanned at 240 pixels per inch requires 40 scan rows, and at 2048 pixels per row and 8 pixels per byte, the minimum size for video buffer 15 is about ten thousand bytes of memory. In this minimum configuration, data may be first scanned into the video buffer 15 and then sequentially processed. If greater throughput is desired, the video buffer 15 may be made two or more times larger. In this way, data from one line may be processed while the next line is being scanned, thus facilitating simultaneous scanning and processing. In either case, scanning may be stopped at any time to allow for extended processing and reprocessing of unusually difficult text.

FIGS. 13a, b and c comprise a detailed schematic diagram of the isoslation module 61, and illustrate one embodiment which contains the system microprocessor 63 that controls the video data acquisition, the character isolation, the recognition and communications, and the like.

Figure 14B:
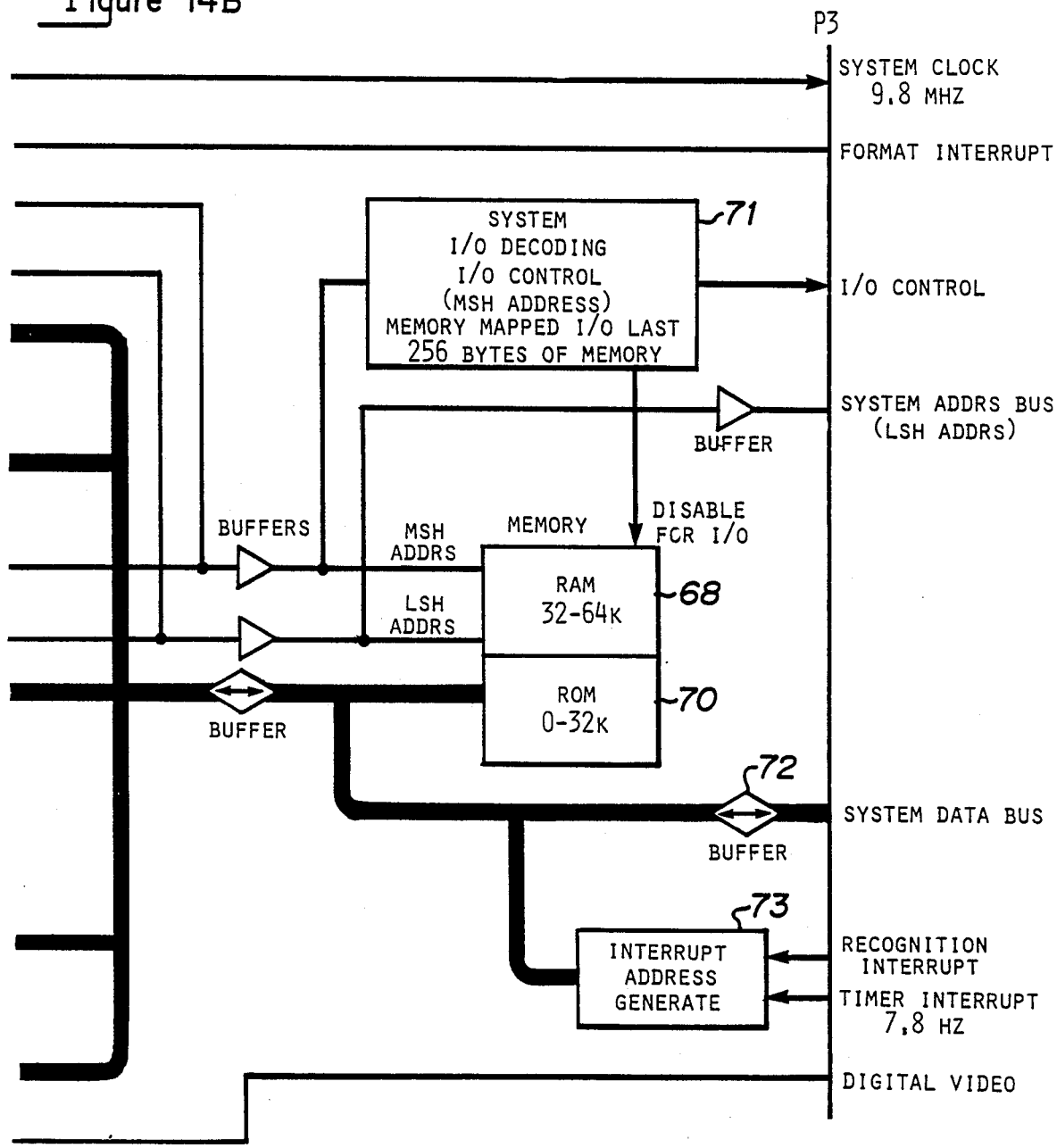

The block diagram of FIG. 14 illustrates one embodiment of the isolation processor module 61 which performs the isolation, decomposition, and page reconstruction schemes in the manner previously described using the commercially-available components operating according to the sequence of operations previously described. Either serial digital video or internally generated test video 63 is selected by a multiplexer 62 and converted to bytes 64. As each byte is assembled, it is placed in a holding register 65 and a DMA request is generated 66. The DMA controller 67 then reads the byte from the holding register 65 and places it in the video buffer in RAM 68. The microprocessor 69, controlled by Isolation software contained in system ROM 70, then isolates characters as described herein and passes them over the system IO BUS 71, 72 to Recognition hardware. The Recognition hardware interrupts 73 the microprocessor to indicate Recognition completion. Characters are then reassembled into words and lines by the microprocessor, controlled by line recombination software in system ROM. Each output line is then output by means of a serial transceiver 74, operating through an RS232 line driver 75 and an RS232 jumper pad 76.

APPENDIX A: ISOLATION SOFTWARE MODULES

Each Isolation software module is provided on a separate listing and may be identified by the module name appearing within a rectangle of asterisks located near the top of the first page of each listing. Figures and item numbers refer to drawings located in the main body of the patent application.

ISODEF—Contains control information used by all modules in the system.

ISOSYS—The system control module contains the power-on self-test code, inter-process and inter-processor communications control, and page detection control.

ISOVID—Contains the video buffer control software.

ISOSEP—Is called by ISOSYS when a page is detected and contains the main body of the character isolation software as described in FIG. 3.

ISOTCH—Is called by ISOSEP when a character is not bounded by white (FIG. 3, item 29) and detects and removes underlines 31, 32; tests for oversized characters 33; and controls isolation of overlapping and touching characters 35.

ISOMBP—Is called by ISOTCH when oversized characters are detected to locate the bounds of unrecognizable characters and remove them from the video buffer.

ISOPGI—Implements the word reconstruction shown in FIG. 9.

Figure 10:
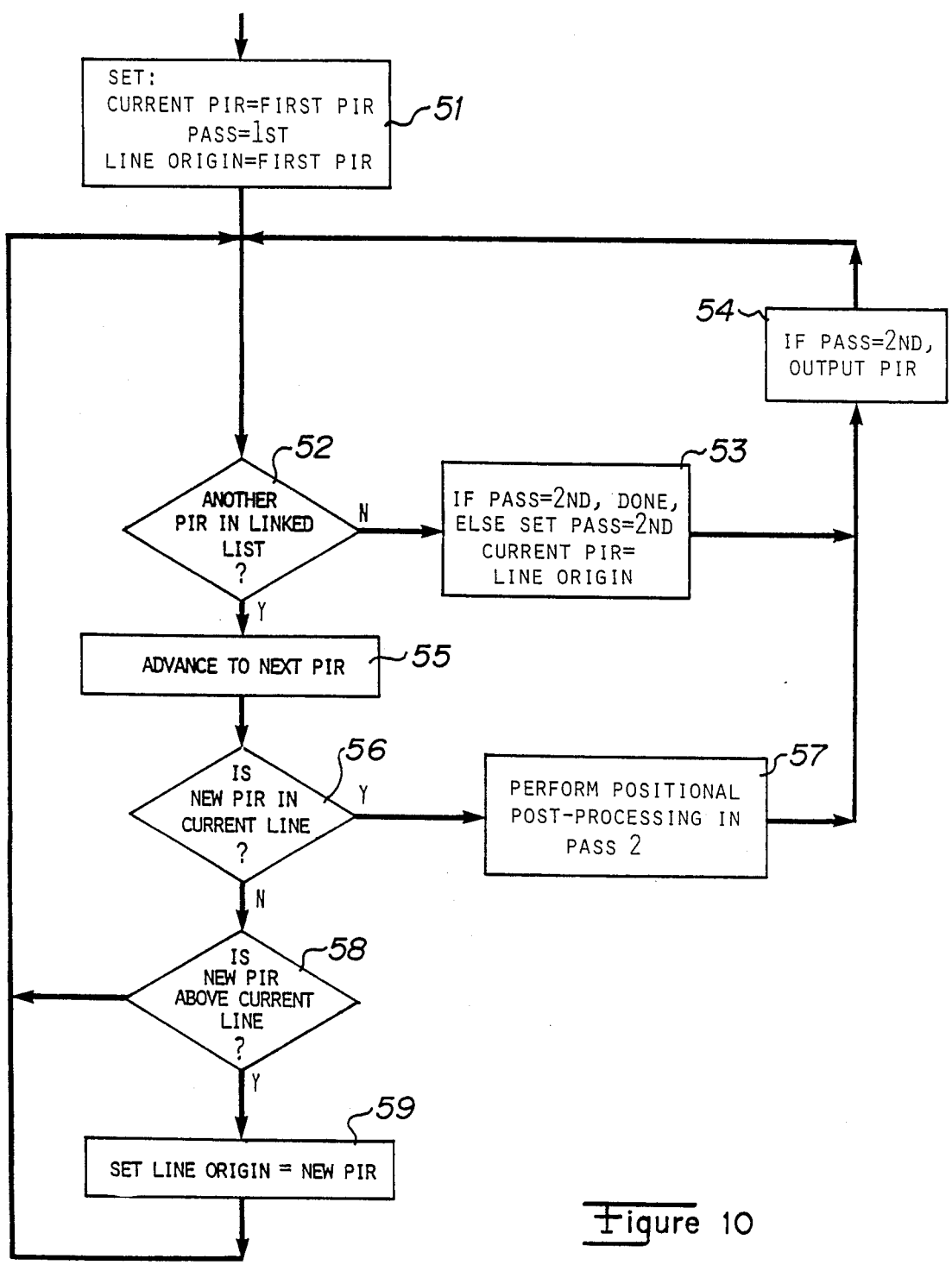
FIG. 10 is a flow chart illustrating the page-reconstruction processing involving line reconstruction.

ISOPGO—Implements the line reconstruction shown in FIG. 10.

ISOPS1—Is called by ISOPGO to perform positional post processing 57 as well as underline processing and noise filtering.

ISOCPP—Perfoms certain contextual post processing on the reconstructed line to improve recognition accuracy.

ISOUTL—Contains utility routines used by the rest of the system.

ISOTST—Contains test routines used during production video alignment of the system.

What is claimed is:

1. Method of producing output data representative of isolated information markings within a class of such markings oriented on a document, the metod comprising the steps of:

vertically sensing the information markings in a selected sequence to produce word data manifestations of the sensed information markings on a word by word basis where said information markings are in the form of a word and where said class of markings are in the form of text, storing the word data manifestations in substantially similar orientation to the orientation of the sensed information markings on the document, selectively addressing stored word data manifestations oriented with respect to a selected reference location, producing encoded output in recognition of selectively addressed stored word data manifestations as specific ones of the information markings within the class of such markings, deleting from storage the selectively addressed word data manifestations which are recognized, and (a) selectively addressing any remaining stored word data manifestations which are selectively oriented in storage with respect to the locations of the deleted word data manifestations, and (b) successively producing encoded outputs in recognition of any successively addressed word data manifestations, and (c) successively deleting from storage any successively addressed word data manifestations which are recognized, until such recognitions and deletions from storage of word data manifestations extend to a selected orientation limit, and selectively accumulating the encoded outputs to provide isolated output data representative of the information word markings and the orientations thereof on the document.

2. The method according to claim 1 wherein in the step of selectively addressing stored data manifestations, the selected reference location is the top-most stored data manifestation located maximally displaced to one side.

3. The method according to claim 2 wherein the step of successively addressing any remaining stored data manifestations continues to one limit of a contiguous array of data manifestations representing a continuous succession of sensed information markings on the document.

4. The method according to claim 3 comprising the step of establishing said one limit at a separation between contiguous data manfestations located not greater than a predetermined number of data manifestations displaced away from said selected reference location.

5. The method according to claim 3 comprising the step of successively addressing any remaining stored data manifestations to an opposite limit from said one limit of the contiguous array of data manifestations to establish an image record of said encoded outputs representative of a set of contiguous information markings from the beginning to the end thereof.

6. The method according to claim 5 comprising the steps of: selectively addressing any remaining stored data manifestations commencing at the reference location at which the top-most remaining stored data manifestation maximally displaced to one side is located; and successively addressing the stored data manifestations between opposite ends of a contiguous array thereof to establish an image record of said encoded outputs representative of another set of contiguous information markings on the document.

7. The method according to claim 6 comprising the step of: coding the image records with data indicative of the orientations thereof within an array of stored data manifestations; and wherein said step of selectively accumulating the encoded outputs includes assembling the image records of encoded outputs according to selected coding data associated therewith to produce said output data representative of the information mailings and the orientations thereof on the document.

8. The method according to claim 1 wherein the step of producing encoded outputs includes:

forming image records, each represenative of a contiguous set of information markings on the document between left and right limits thereof, and each including coding data indicative of the location of the corresponding information markings on the document;

and including the step of assembling a plural number of image records in sequence according to coding data associated therewith to provide said output data representative of the information markings and the orientations thereof on the document.

9. Method according to claim 8 wherein each image record includes a representative baseline associated wtih the number of encoded outputs contained therein; and comprising the step of:

identifying the image record in a plural number thereof having associated coding data representing a reference orientation; and successively combining remaining ones of the plurality of image records in selected sequence according to coding data associated therewith and with the baselines thereof substantially aligned for reproducing the sequence of information markings on the documents, independently of any horizontal skew orientation thereof.

10. The method according to claim 9 wherein in the step of successively combining, a first set of a number of image records combined in sequence represent a first line of information markings on the document; and a second set of a number of image records combined in sequence represent a second line of information markings displaced vertically on the document from the first line, and including the step of comparing coding data associated with the initial image record in each of the first and second sets thereof; and altering coding data associated with the location of the initial image record in one of the first and second sets thereof if the difference between location coding data therefor is less than a preselected value for reproducing the first and second sets of image records with the beginnings thereof oriented in substantial vertical alignment, independently of any vertical skew orientation of the beginnings of the sets of corresponding information markings on the document.

11. Method according to claim 1 comprising the additional step of:

determining the magnitude of the addressed stored data manifestation within substantially contiguous boundaries;

deleting from storage as representing noise the addressed stored data manifestations which are determined to be less than a preselected magnitude;

processing for recognition the addressed stored data manifestations which are determined to be greater than the preselected magnitude.

12. Method according to claim 11 comprising the step of:

storing for reformation the data manifestations which are determined to be greater than the preselected magnitude and which do not provide encoded output in recognition thereof.

13. Method according to claim 1 for producing output data representative of information markings including underlines of the markings oriented on a document, the method comprising the step of:

isolating for recognition any separated segments of addressed stored data manifestations substantially at the locations of interruptions in horizontal lines of data manifestations being substantially vertically aligned.

14. Method according to claim 13 comprising the steps of:

determining the length of a contiguous set of addressed stored data manifestations between said interruptions;

deleting from storage the data manifestations representing underline between the interruptions for contiguous sets greater than a selected length; and accumulating encoded outputs, including an encoded output representing underline, to provide output data representative of the information markings, and underlines thereof, and the respective orientations thereof on the document.

15. Method according to claim 14 comprising the steps of:

determining the length between interruptions of a contiguous set of addressed stored data manifestations remaining after delection of the data manifestations representing underline, where such remaining set has length greater than the normal width represented by one information marking, to identify information markings which touch or overlap; and separating such remaining set at a selected location spaced from an end thereof that substantially equals the width represented by one information marking; and buffer storing the data manifestations forming one of the separated segments of the set and deleting the same from storage, and alternatingly therewith;

producing encoded coding in recognition of the data manifestations forming the other of the separated segments of the set.

16. Method according to claim 15 wherein in the step of separating:

such remaining set is separated substantially at a location closest to said selected location at which the number of data manifestations forming the contiguous set is lowest.

17. Method according to claim 1 wherein:

the encoded outputs produced in recognition of selected addressed data manifestations include an encoded output indicating which information marking of the class, with baseline data therefor, is most likely represented by such data manifestations, and also an encoded output indicating which information marking of the class, with baseline data therefor, is next most likely represented by such data manifestations; and the step of selectively accumulating the encoded outputs includes:

forming sets of encoded outputs representing contiguous information markings on the document by combining only those encoding outputs for the most likely and next most likely representations for which the associated baseline data is also in closest correlation.

18. Isolation apparatus for producing output signals indicative of information markings within a class of such markings oriented on a document, the apparatus comprising:

transducer means disposed with respect to a document for vertically producing word data signals representative of information markings at selected locations on the document on a word by word basis where said information markings are in the form of words and where said class of markings are in the form of text, storge means coupled to the transducer means for storing word data signals therein in substantially similar orientation to the orientation of the corresponding information markings on the document, circuit means coupled to the storage means for addressing word data signals stored therein at selected locations, recognition circuit means responsive to the addressed data signals in the storage means for producing code signals indicative of the addressed word data signals corresponding substantially to an information word marking within the class of such markings, means coupled to the storage means for removing from storage therein the stored word data signals corresponding to the information marking for which code signals were produced, said circuit means being operative thereafter for addressing any remaining word data signals stored in said storage means at selected locations relative to the locations of previously removed word data signals, said recognition circuit means producing isolation code signals indicative of such remaining addressed word data signals corresponding substantially to information marking within the class of such markings, said means operating to remove from storage the word data signals for which code signals were produced until the removals of word data signals in storage extend to a selected orientation limit, and compiling means coupled to receive said isolation code signals for assembling same in selected sequence to produce isolated output signals representative of the information markings and the orientations thereof on the document.

19. Document-handling system for producing isolation output signals representative of information markings oriented on the document, the system comprising:

sensing means mounted with respect to a document for vertically producing word data signals in response to detection of selected portions of information markings on the document on a word by word basis where said information markings are in the form of words and where said class of markings are in the form of text, transport means coupled to the document for selectively displacing the document incrementally along a direction relative to the sensing means, storage means coupled to the sensing means for storing word data signals at addressable locations therein, circuit means coupled to the storage means for selectively addressing word data signals therein to produce isolation output signals representative of substantially corresponding information markings, and to remove from said storage means the selectively addressed word data signals for which isolated output signals are produced, and control means coupled to said transport means and said storage means and said circuit means for successively displacing the document incrementally at a rate sufficient to maintain the storage means substantially filled with word data signals as the same are selectively addressed and removed therefrom.

* * * * *